United States Patent
Miyazaki

(10) Patent No.: US 9,669,809 B2
(45) Date of Patent: Jun. 6, 2017

(54) BRAKE CONTROL DEVICE FOR VEHICLE

(71) Applicant: Tetsuya Miyazaki, Toyota (JP)

(72) Inventor: Tetsuya Miyazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 66 days.

(21) Appl. No.: 14/782,628

(22) PCT Filed: May 13, 2013

(86) PCT No.: PCT/JP2013/063271
§ 371 (c)(1),
(2) Date: Oct. 6, 2015

(87) PCT Pub. No.: WO2014/184841
PCT Pub. Date: Nov. 20, 2014

(65) Prior Publication Data
US 2016/0167631 A1 Jun. 16, 2016

(51) Int. Cl.
| | |
|---|---|
| *B60T 8/17* | (2006.01) |
| *B60T 11/16* | (2006.01) |
| *B60T 13/14* | (2006.01) |
| *B60T 17/22* | (2006.01) |
| *B60T 7/04* | (2006.01) |
| *B60T 13/66* | (2006.01) |
| *B60T 13/68* | (2006.01) |
| *B60T 8/88* | (2006.01) |
| *B60T 8/40* | (2006.01) |

(52) U.S. Cl.
CPC ........ *B60T 8/17* (2013.01); *B60T 7/04* (2013.01); *B60T 7/042* (2013.01); *B60T 8/885* (2013.01); *B60T 11/16* (2013.01); *B60T 13/146* (2013.01); *B60T 13/662* (2013.01); *B60T 13/686* (2013.01); *B60T 17/22* (2013.01); *B60T 17/226* (2013.01); *B60T 8/4081* (2013.01); *B60T 2270/402* (2013.01); *B60T 2270/604* (2013.01); *Y10S 903/947* (2013.01)

(58) Field of Classification Search
CPC .......... B60T 8/17; B60T 11/16; B60T 13/146; B60T 17/226
See application file for complete search history.

(56) References Cited

U.S. PATENT DOCUMENTS

2010/0030421 A1* 2/2010 Yoshimura ............... B60K 6/46
701/31.4

FOREIGN PATENT DOCUMENTS

JP 2011-25803 A 2/2011

* cited by examiner

Primary Examiner — Basil T Jos
(74) Attorney, Agent, or Firm — Oblon, McClelland, Maier & Neustadt, L.L.P.

(57) ABSTRACT

A brake ECU sets two sensor state flags to fix states of first and second master pressure sensors as an abnormal state when a value of a simultaneous timer becomes equal to or larger than an abnormal-state fixing time. The simultaneous timer serves to measure a time that the first master pressure sensor is determined to be not under a normal state and the second master pressure sensor is determined to be not under a normal state on the basis of the sensor state flags. The abnormal-state fixing time is set to a time shorter than an abnormal-state fixing time used for changing the state of each of the master pressure sensors from an invalid state to an abnormal state.

7 Claims, 17 Drawing Sheets

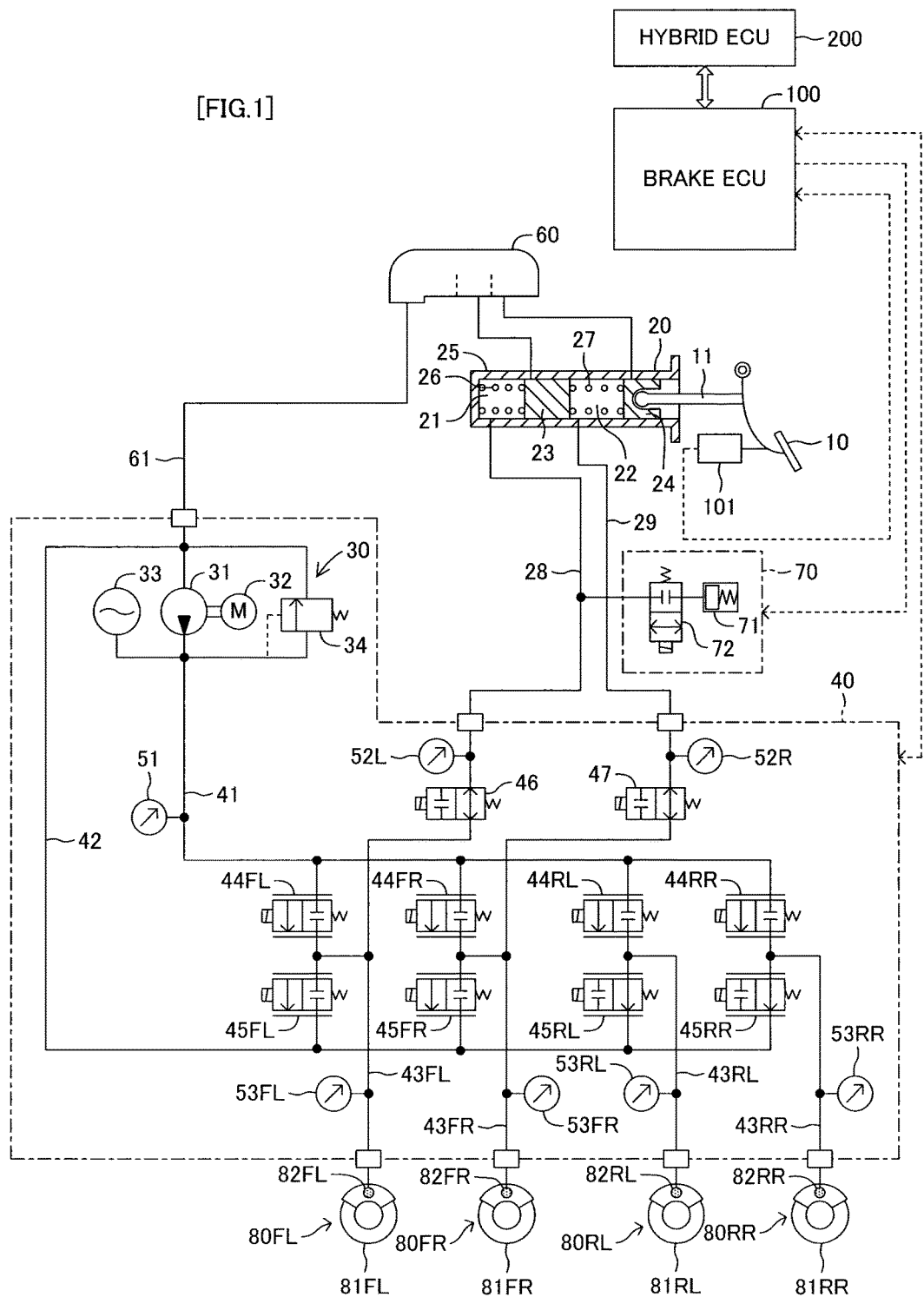
[FIG.1]

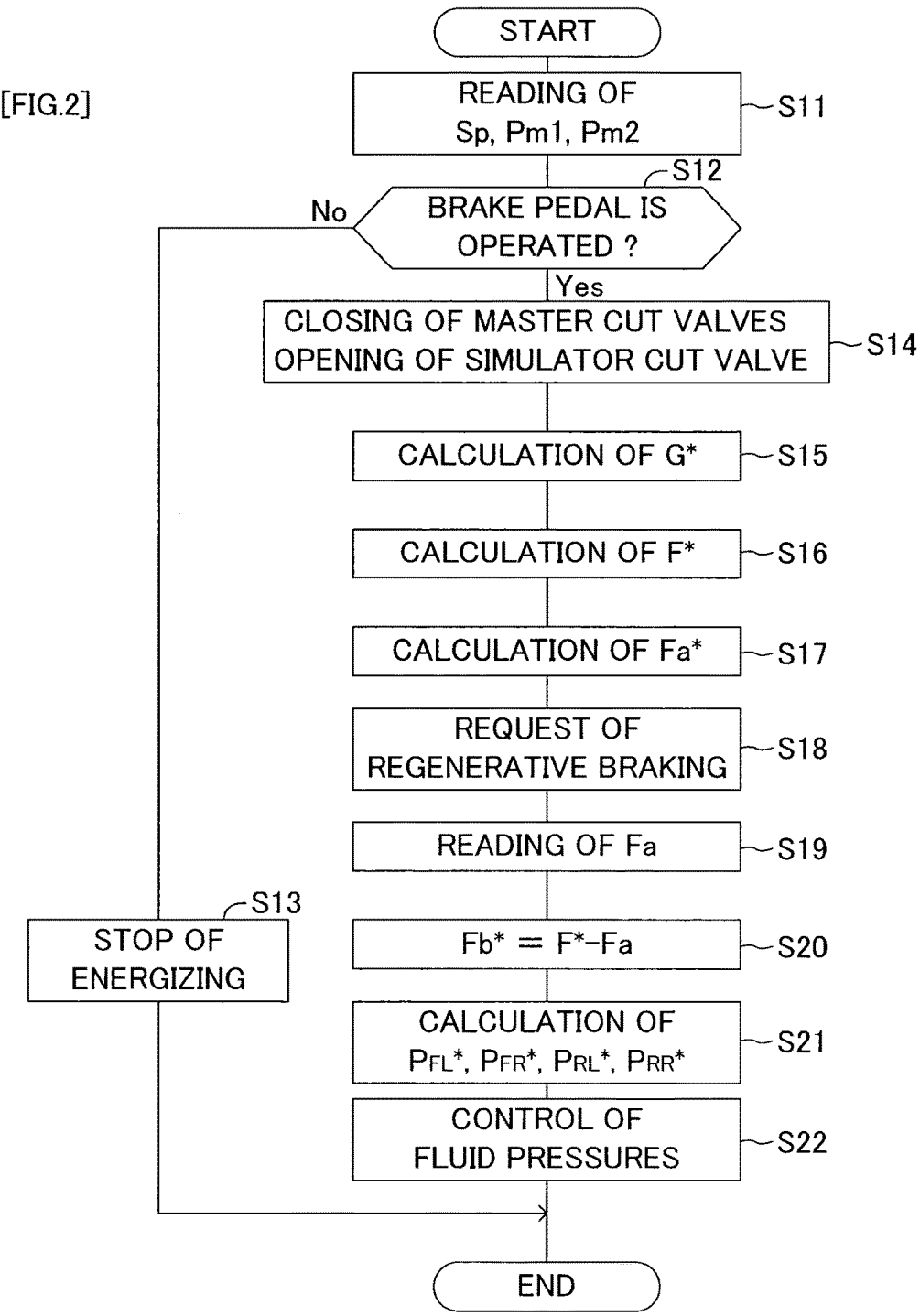
[FIG.2]

[FIG.3]
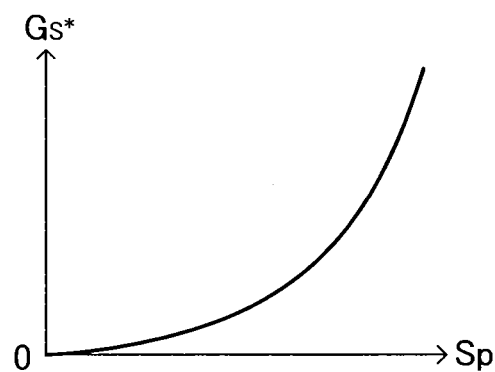
[FIG.4]
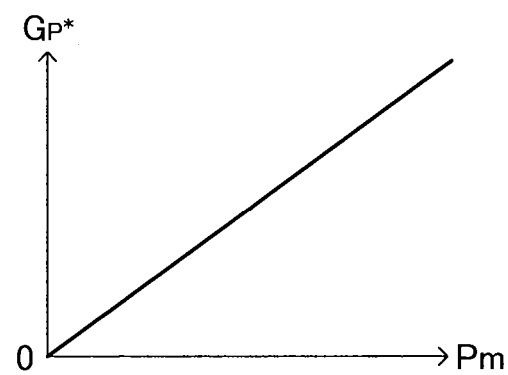
[FIG.5]
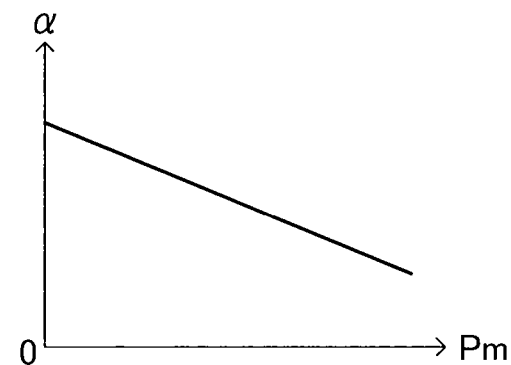

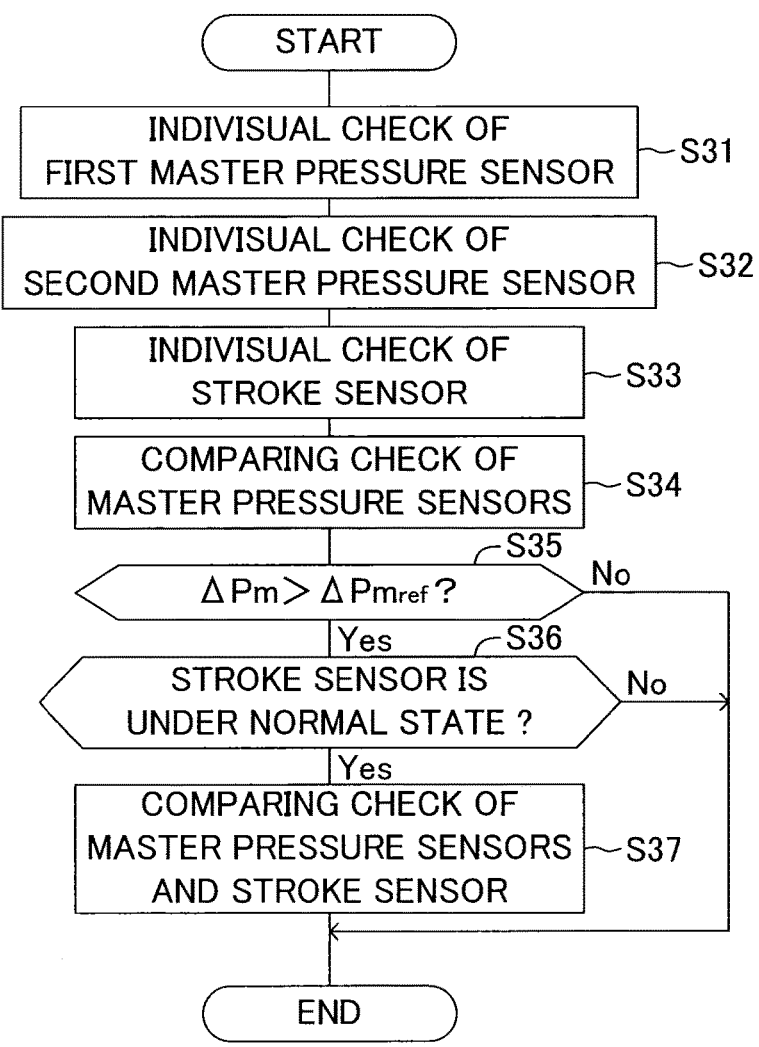

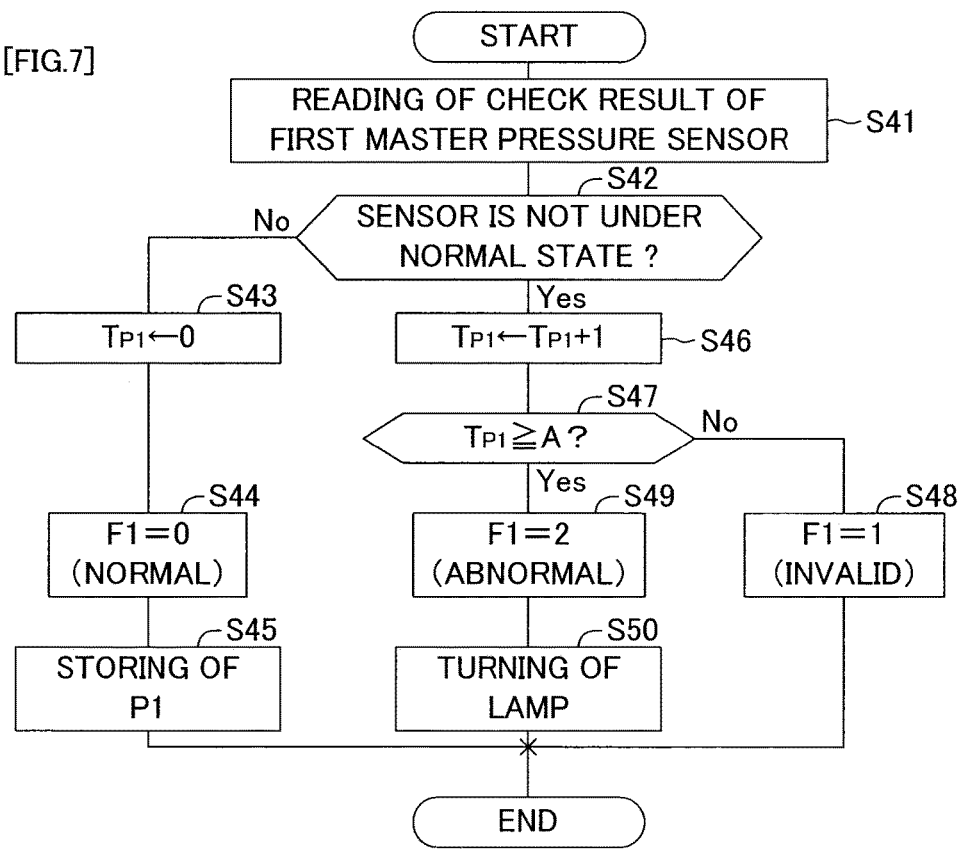

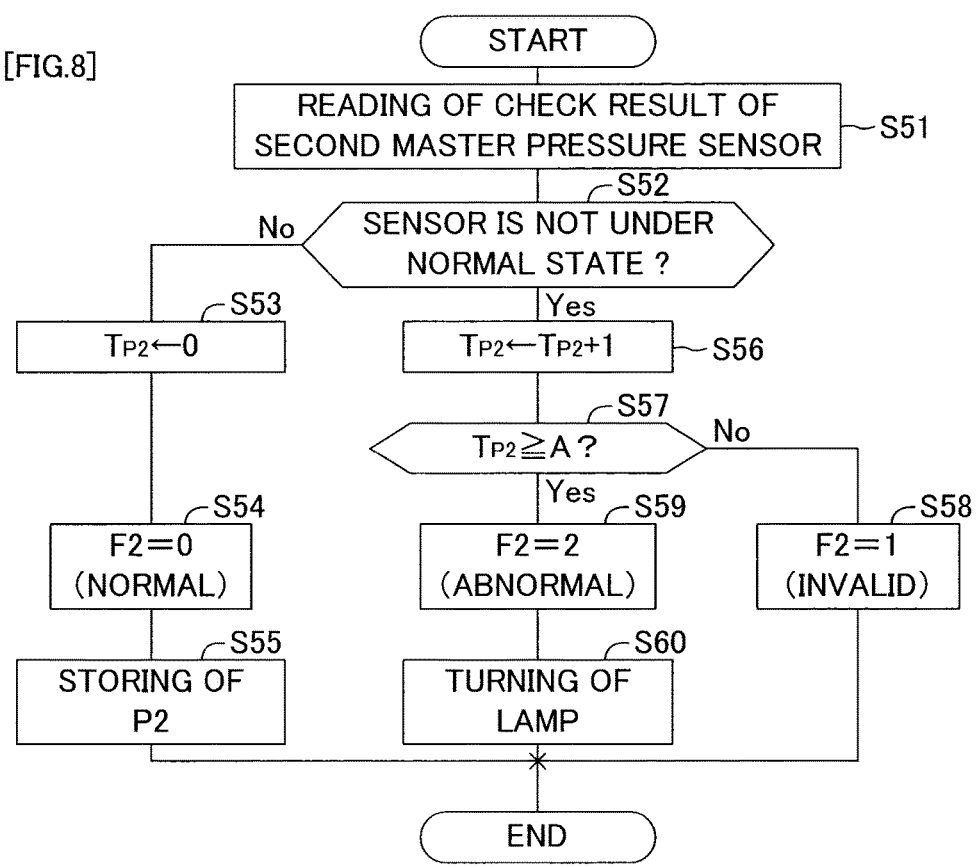
[FIG.8]

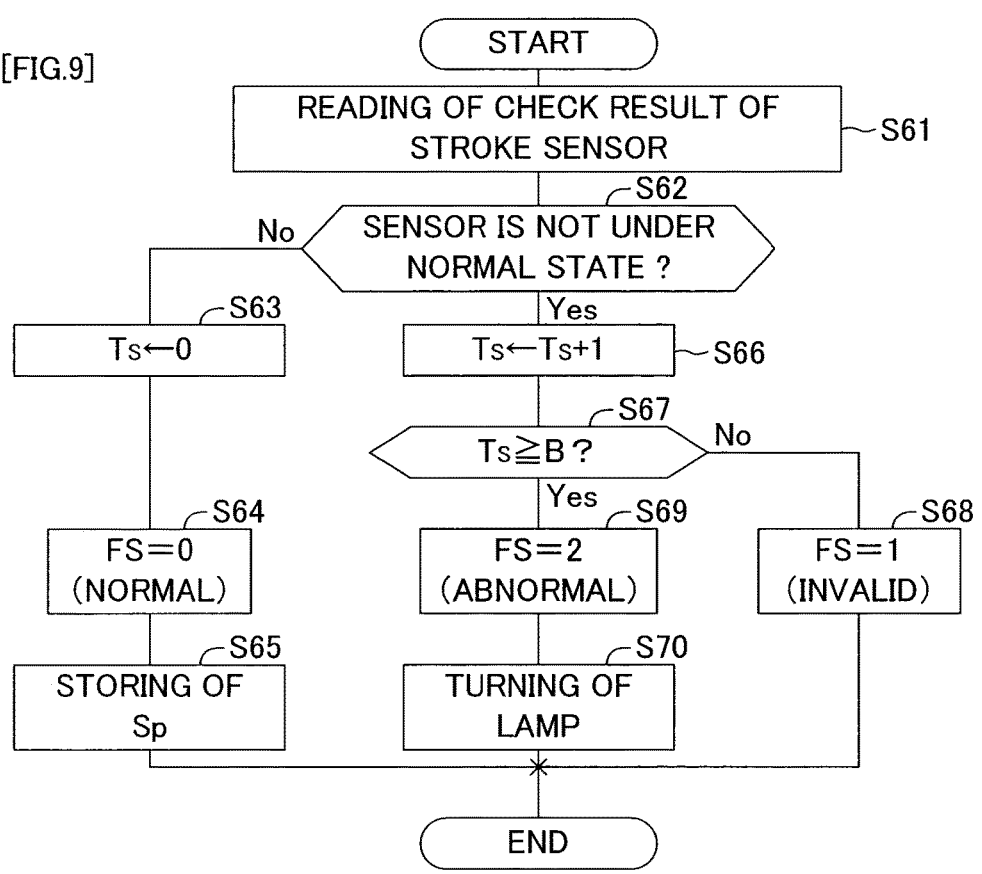

[FIG.10]
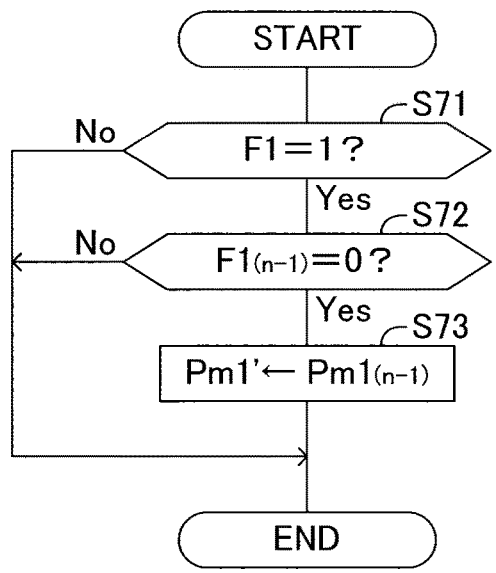
[FIG.11]
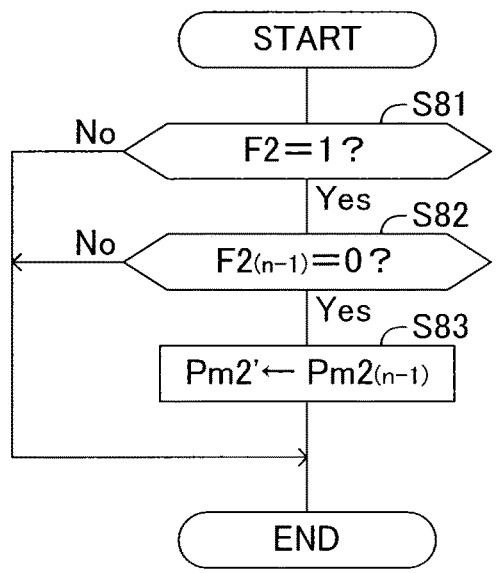

[FIG.12]
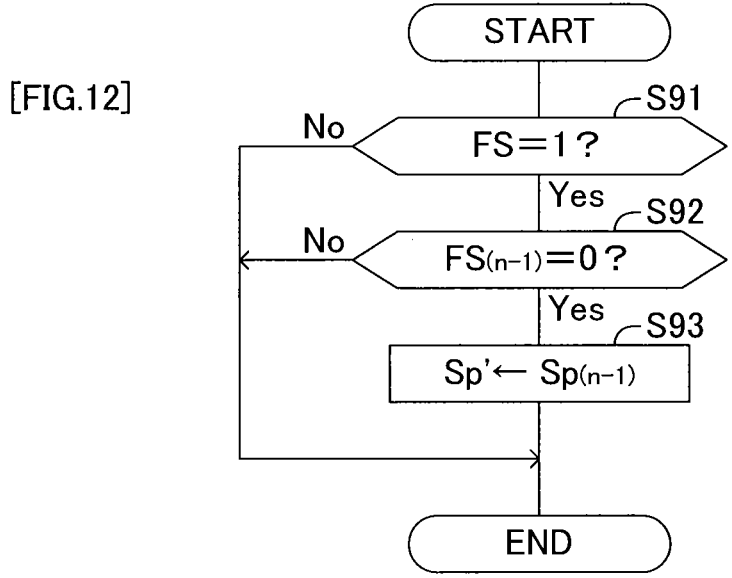
[FIG.13]
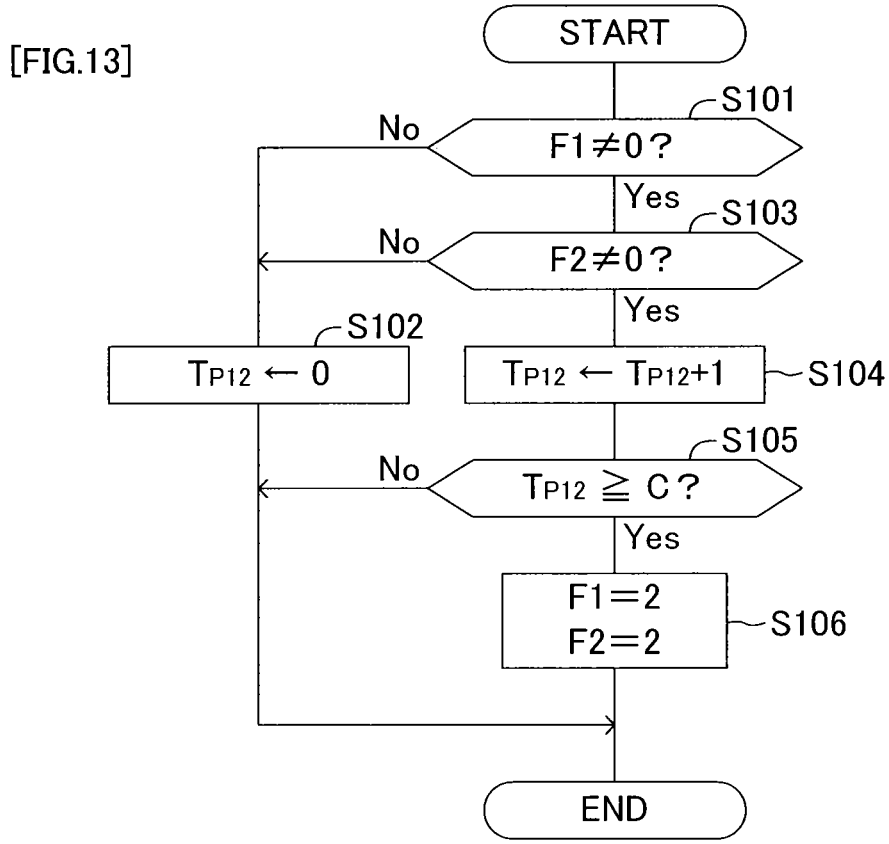

[FIG.14]
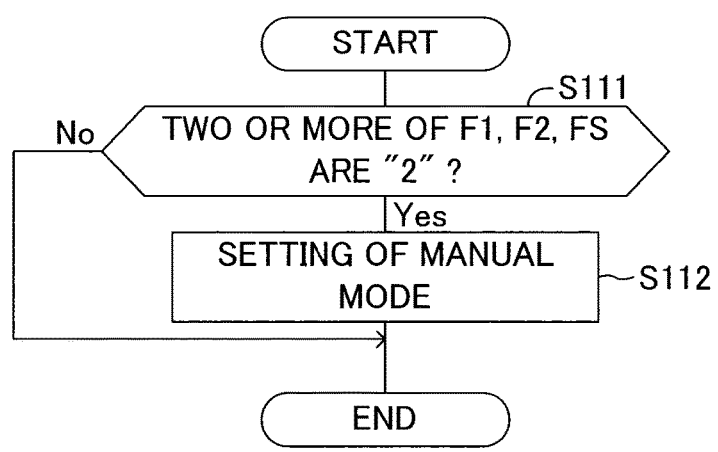

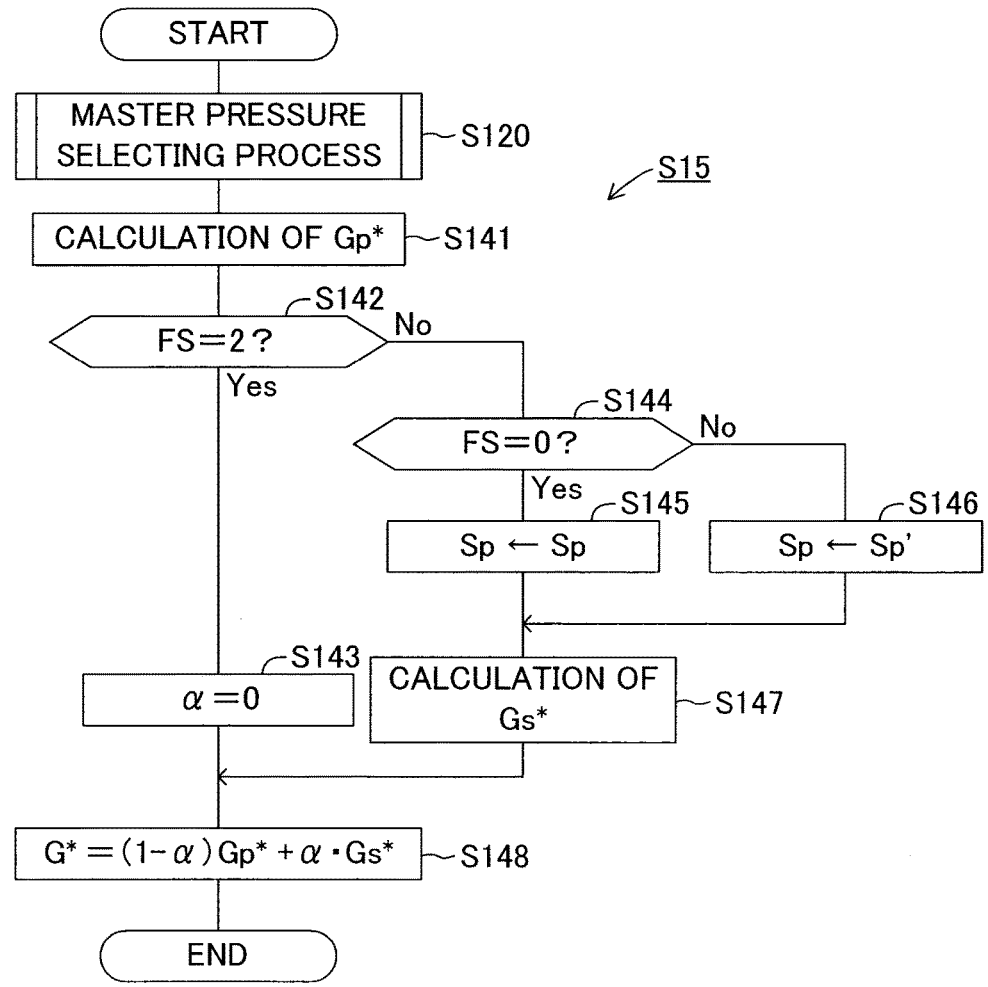
[FIG.15]

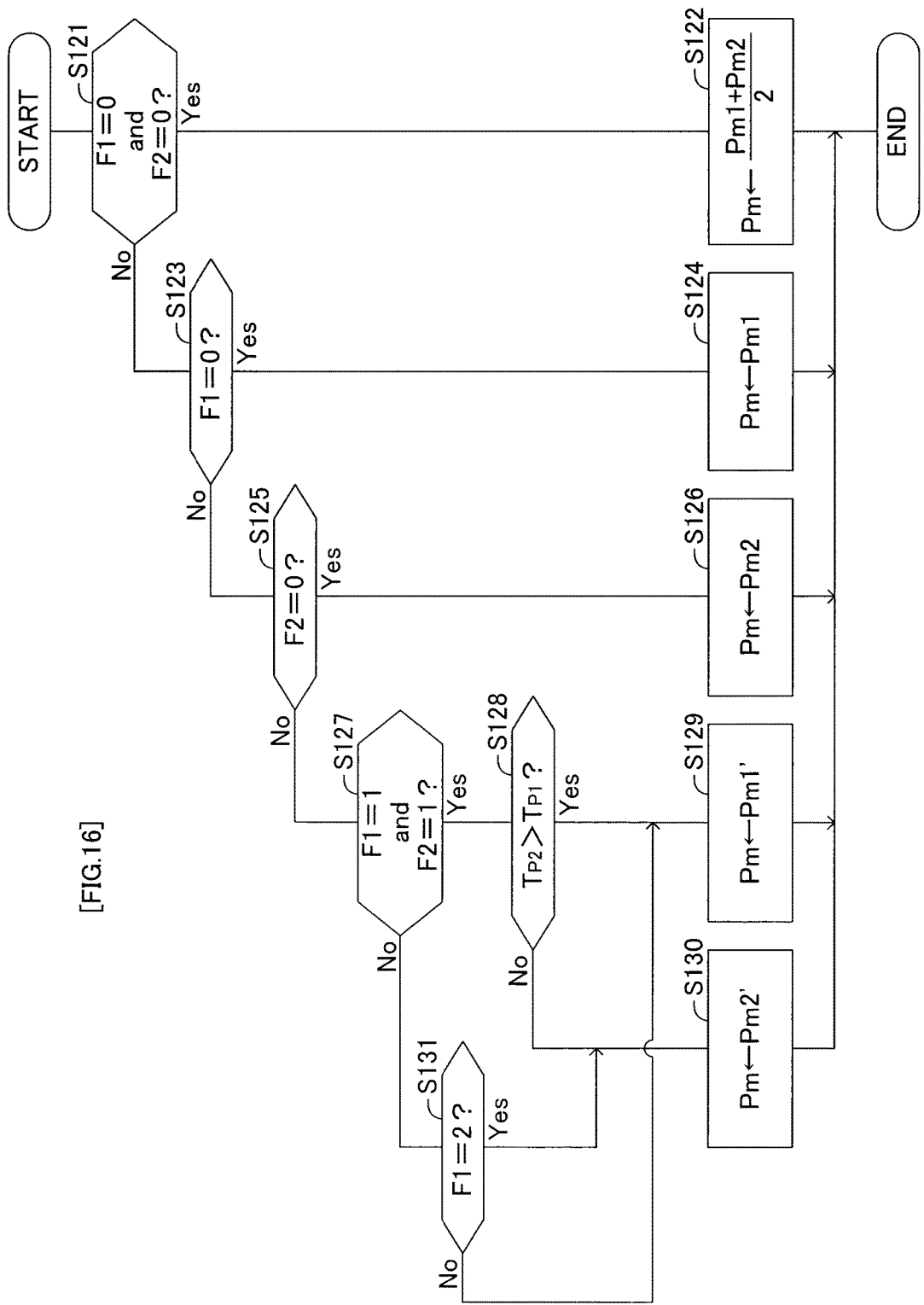
[FIG.16]

[FIG.17]
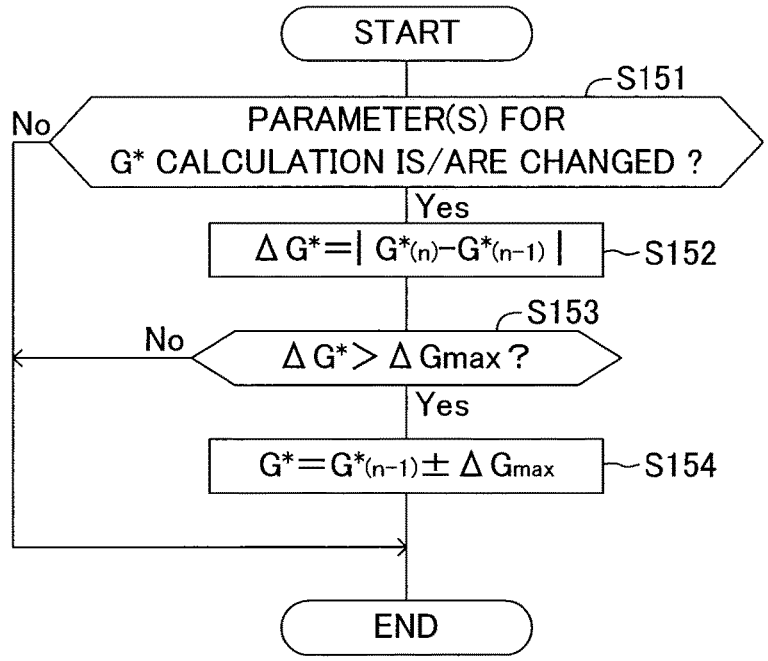
[FIG.18]
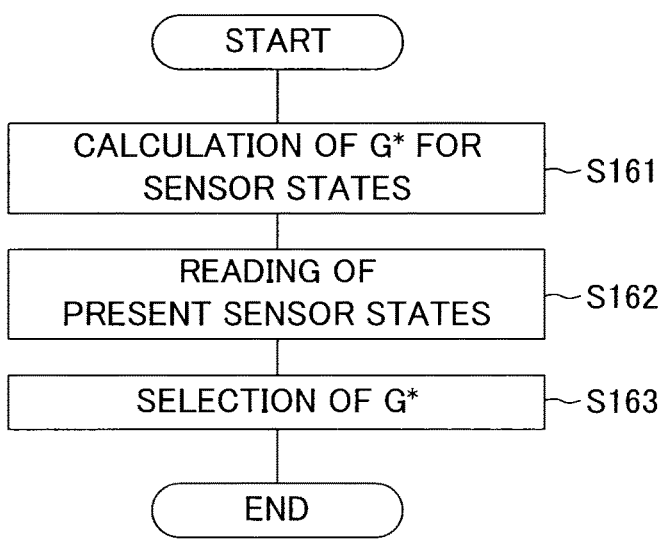

[FIG.19]
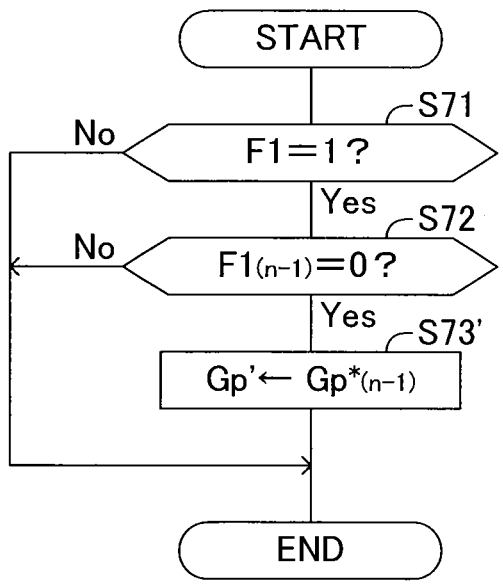
[FIG.20]
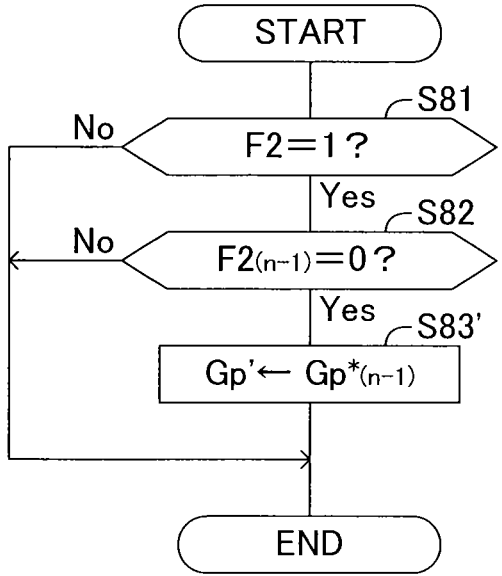

[FIG.21]
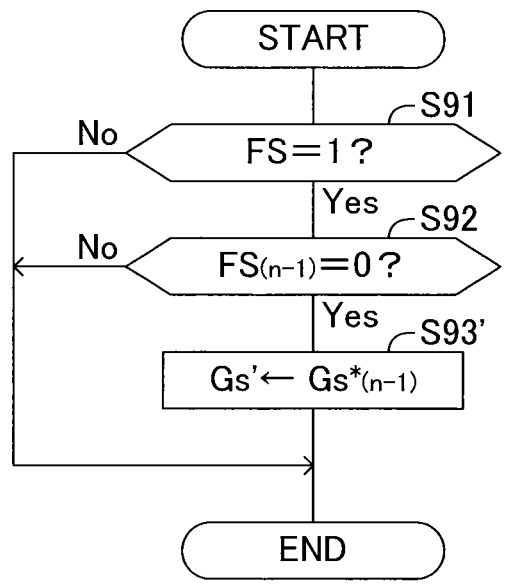

[FIG.22]
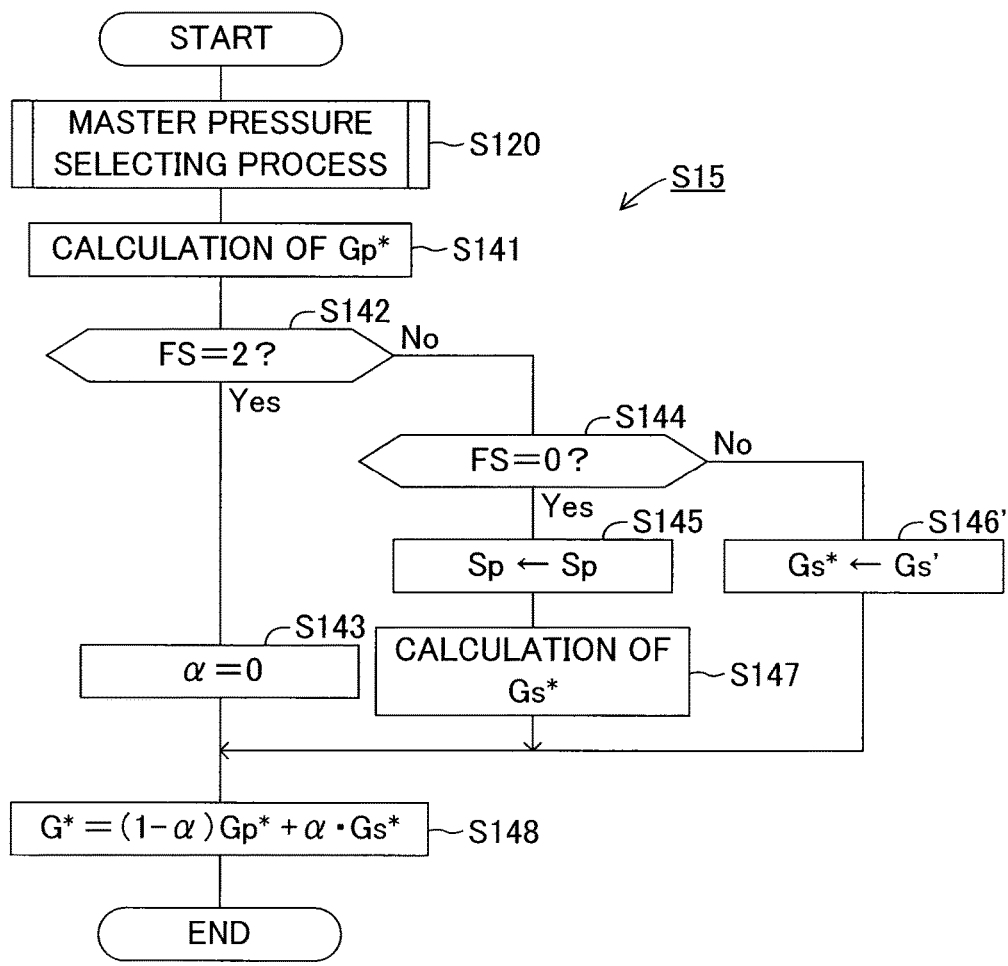

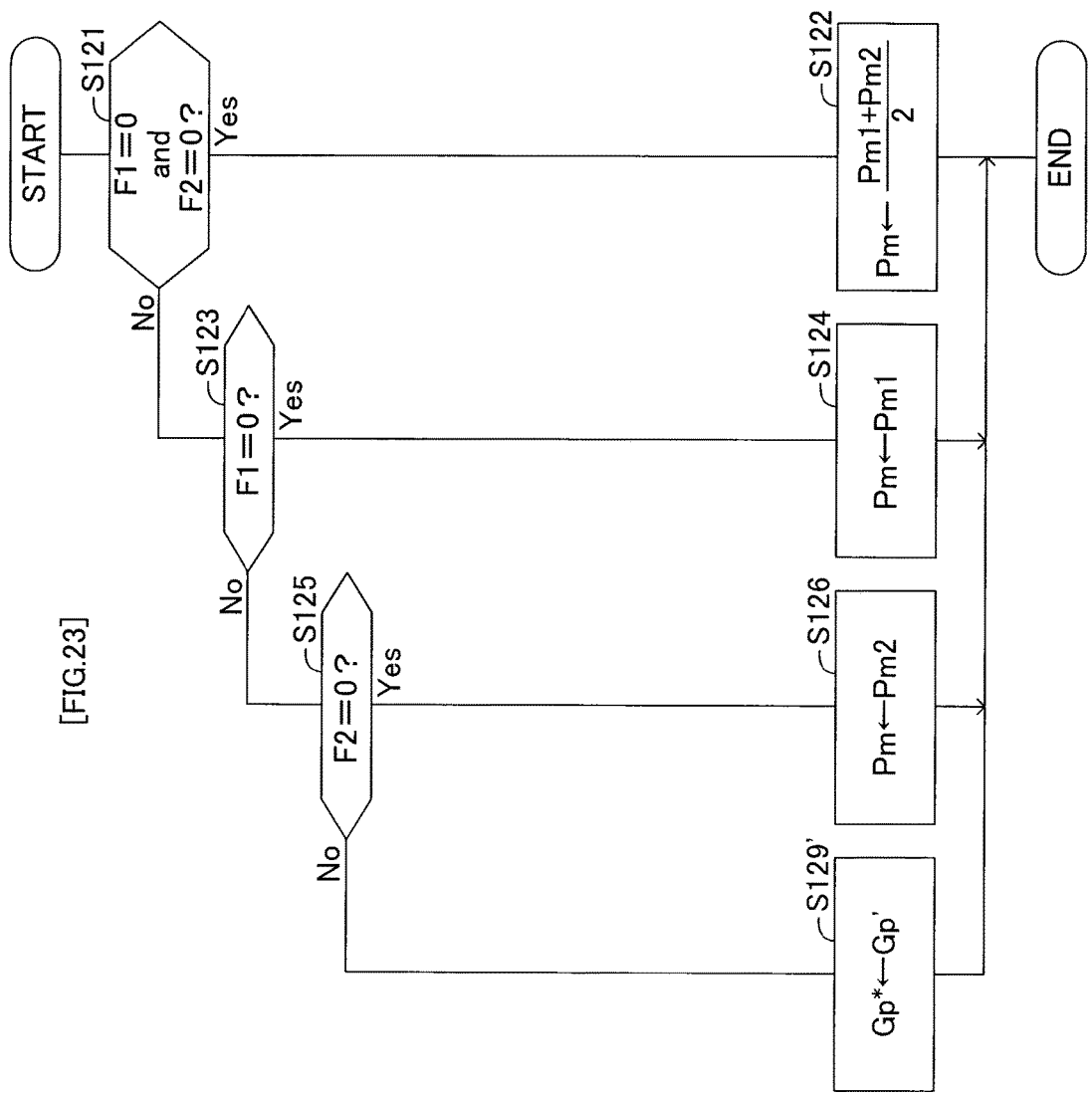

BRAKE CONTROL DEVICE FOR VEHICLE

TECHNICAL FIELD

The present invention relates to a brake control device for a vehicle for controlling a brake actuator on the basis of a brake operation amount to apply braking forces to vehicle wheels.

BACKGROUND ART

Conventionally, there is known a brake control device for a vehicle provided with same-type brake operation sensors, which are the same in type, each for detecting an operation amount of a brake operation member. For example, there is known a brake control device having two pressure sensors for detecting fluid pressures in two operating fluid passages for supplying the fluid pressure from a master cylinder to wheel cylinders. The brake control device uses each of the pressure sensors as the brake operation sensor. Such a brake control device calculates a target deceleration degree for the vehicle by using detection values of the brake operation sensors and controls the brake actuator to apply the braking forces to the vehicle wheels for accomplishing the target deceleration degree.

Further, the Patent Literature 1 has proposed a technique for determining whether or not each of three pressure sensors is under an abnormal state by comparing detection values of the pressure sensors with each other, each of the pressure sensors serving to detect a fluid pressure of the operating fluid in the brake actuator. The brake control device proposed in the Patent Literature 1 compares detection values of two of the pressure sensors with each other. When an absolute value of a difference between the detection values is equal to or larger than a threshold, the brake control device compares one of the two detection values with a detection value of the remaining pressure sensor. When an absolute value of a difference between the one of the two detection values and the detection value of the remaining pressure sensor is smaller than a threshold, the brake control device determines that the pressure sensor which outputs the other of the two detection values is not under the normal state. In this case, when a duration time that the pressure sensor has been determined to be not under the normal state becomes equal to or longer than a sensor abnormal-state fixing time, the abnormal state of the pressure sensor is fixed. Below, a state until the abnormal state is fixed after the pressure sensor is determined to be not under the normal state, will be referred to as the invalid state.

CITATION LIST

Patent Literature

Patent Literature 1: JP 2011-25803 A

SUMMARY OF THE INVENTION

In the brake control device proposed in the Patent Literature 1, a fail-safe such as how to set the target value depending on the detection of the abnormal state of the pressure sensor and when an abnormal-state-associated process is executed, is not considered. For example, a conventional brake control device detects brake operation amounts (pedal depression forces) by two pressure sensors and sets an average value of the two detection values as the pedal depression force. In this case, when one of the pressure sensor is determined to be under the invalid state, held is a detection value acquired immediately before the pressure sensor is determined to be under the invalid state. This held detection value will be referred to as the held value. Therefore, the pedal depression force is set by using an average value of the held value of one of the pressure sensors and the detection value detected by the other normal-state pressure sensor.

Even if the pressure sensor is under the normal state, the detection value may depart from a normal range temporarily. Therefore, in general, a duration time requirement is set as a requirement until an invalid-state pressure sensor is fixed as a abnormal-state pressure sensor after the pressure sensor is determined as the invalid-state sensor. For example, when the pressure sensor has been determined as the invalid-state sensor for the sensor abnormal-state fixing time or more, the invalid-state sensor is fixed as abnormal-state sensor. Recently, in order to improve a brake feeling, a sliding friction resistance of a master cylinder piston is increased. Due to this increasing of the sliding friction resistance, a delay may occur in a following property of the pressure of the master cylinder. In this case, in order to avoid a wrong fixing of the abnormal state due to the aforementioned delay in the following property of the pressure, a need of increasing a time required for fixing the abnormal state is increased. In this case, the calculated target deceleration degree may not follow the brake pedal operation by the influence of the held value. Thus, generated may be a brake remaining phenomena that the braking force remains even when the driver releases the brake pedal.

An object of the present invention is made to solve the problem described above and is to improve the fail-safe with respect to a malfunction of the brake operation amount sensor.

The present invention for solving the problem described above relates to a brake control device for a vehicle, comprising same-type brake operation sensors (52L, 52R) which are the same in type, each of the same-type brake operation sensors being configured to detect an operation amount of a brake operation member (10), the brake control device being configured to calculate a target value on the basis of detection values of the brake operation sensors and control a brake actuator (40) in accordance with the target value to apply braking forces to vehicle wheels, respectively, characterized in that the brake control device comprises:

sensor check means configured to determine whether or not each of the brake operation sensors is under a normal state (S31 to S37);

sensor state setting means configured:

to set, as an invalid-state sensor, the brake operation sensor determined to be not under the normal state by the sensor check means; and to fix, as an abnormal-state sensor, the invalid-state sensor when the invalid-state sensor has continued to be determined as the invalid-state sensor for a predetermined sensor abnormal-state fixing time (A) or more (S47 to S49, S57 to S59);

holding means configured to hold, as a last value, the detection or target value acquired immediately before the invalid-state sensor is set as the invalid-state sensor (S73, S83, S73', S83');

selecting means configured:

to employ the detection value of the normal-state sensor without employing the last value held by the holding means to set the target value when the brake operation sensors include the invalid-state sensor and the normal-state sensor; and to employ the last value held by the holding means to set the target value when the brake operation sensors include no normal-state sensor and the invalid-state sensor (S121 to S130, S129'); and abnormal-state-associated process means configured to execute an abnormal-state-associated process when a state that the brake operation sensors include the sensors each determined to be not under the normal state has continued for an abnormal-state process determination time (C) or more (S101 to S106, S111, S112).

According to the present invention, the vehicle comprises the same-type brake operation sensors which are the same in type and the brake control device is configured to calculate the target value on the basis of the detection values of the brake operation sensors and control the brake actuator in accordance with the target value to apply the braking forces to the vehicle wheels, respectively. The same-type brake operation sensors are sensors each for detecting a common physical amount (a fluid pressure, a distance, a force or the like) which varies in response to a brake operation. The target value is a target value for generating a braking force depending on the brake operation amount and for example, is a target deceleration degree of a vehicle body, a target braking force for the vehicle wheel, a target fluid pressure of a wheel cylinder, a target control amount of the brake actuator or the like.

The sensor check means determines whether or not each of the brake operation sensors is under the normal state. When the sensor check means determines that at least one of the brake operation sensors is not under the normal state, the sensor state setting means sets, as the invalid-state sensor, the brake operation sensor determined to be not under the normal state and when the invalid-state sensor has continued to be set as the invalid-state sensor for the sensor abnormal-state fixing time or more, the sensor state setting means fixes, as the abnormal-state sensor, the invalid-state sensor. The holding means holds, as the last value, the detection value acquired immediately before the invalid-state sensor is set as the invalid-state sensor or the target value (acquired immediately before the invalid-state sensor is set as the invalid-state sensor). Note that the last value is not limited to the single detection or target value and may be a value set by using the predetermined number of the detection or target values acquired immediately before the determined state of the sensor is changed from the normal state to the invalid state.

The selecting means employs the detection value of the normal-state sensor without employing the last value held by the holding means to set the target value when the brake operation sensors include the invalid-state sensor and the normal-state sensor. The selecting means employs the last value held by the holding means to set the target value when the brake operation sensors include no normal-state sensor and the invalid-state sensor. Therefore, when there is at least one normal-state sensor, the target value is not set by using the last value and thus, by setting the sensor abnormal-state fixing time to a long time, the normal-state sensor can be prevented from being wrongly fixed as the abnormal-state sensor. Note that naturally the detection value of the abnormal-state sensor is not employed.

The abnormal-state-associated process means executes the abnormal-state-associated process when the state that the brake operation sensors include the sensors each determined to be not under the normal state (i.e. the state that a plurality of the brake operation sensors are determined simultaneously to be not under the normal state) has continued for the abnormal-state process determination time or more. Therefore, when a situation that the target value is set by using the last value occurs, the situation is limited by the normal-state process determination time. Thereby, it is possible to suppress the brake remaining phenomena that the braking force remains even when the driver releases the brake pedal. As a result, according to the present invention, it is possible to improve the fail-safe with respect to the malfunction of the brake operation amount sensor. Note that the abnormal-state-associated process may be, for example, a process for stopping the control of the brake actuator or a process for fixing, as the abnormal-state sensor, the sensors determined simultaneously to be not under the normal state.

The present invention has another feature that the abnormal-state process determination time (C) is set as a time shorter than the sensor abnormal-state fixing time (A).

According to the present invention, ensured is a sufficient time for determining whether or not each of the brake operation sensors is under the abnormal state and thus, it is possible to suppress the wrong determination of the state of the sensor. In addition, the time for calculating the target value by using the last value is set as a short time and thus, it is possible to suppress the brake remaining phenomena.

The present invention has further another feature that the vehicle further comprises at least one different-type brake operation sensor (101) in addition to the same-type brake operation sensors, the type of the different-type brake operation sensor being different from the type of the same-type brake operation sensors, and when the sensor check means compares the detection values of the same-type brake operation sensors with each other and as a result, determines that a degree of a difference between the detection values is larger than a determination threshold, the sensor check means specifies the brake operation sensor which is not under the normal state among the brake operation sensors on the basis of a detection value of the different-type brake operation sensor (S34 to S37).

According to the present invention, the vehicle comprises the different-type brake operation sensor in addition to the same-type brake operation sensors, the type of the different-type brake operation sensor being different from the type of the same-type brake operation sensors. For example, when one of the same-type brake operation sensors malfunctions, the detection value of the malfunctioning sensor is different from the detection value of the non-malfunctioning sensor. Thus, it is possible to detect the malfunction by comparing the detection values of the same-type brake operation sensors with each other. In this case, it is impossible to specify the malfunctioning sensor only by comparing the detection values with each other. Accordingly, when the sensor check means compares the detection values of the same-type brake operation sensors with each other and as a result, the degree of the difference between the detection values is larger than the determination threshold, the sensor check means specifies the brake operation sensor which is not under the normal state among the same-type brake operation sensors on the basis of the detection value of the different-type brake operation sensor. Therefore, according to the present invention, it is possible to execute the check with a high accuracy.

The present invention has further another feature that the brake control device further comprises control stop means configured to stop the control of the brake actuator when only one of the same-type brake operation sensors and the different-type brake operation sensor is determined to be under the normal state (S111, S112).

When a plurality of the brake operation sensors are under the normal state, the check by comparing the detection values of the normal-state brake operation sensors with each other can be executed. On the other hand, when only one of the brake operation sensors is under the normal state, the check by comparing the detection values of the normal-state brake operation sensors with each other cannot be executed. Accordingly, the control stop means stops the control of the brake actuator when only one of the same-type brake operation sensors and the different-type brake operation sensor is determined to be under the normal state. Therefore, it is possible to further improve the safe property.

The present invention has further another feature that the vehicle comprises:

two pressure sensors (52L, 52R) as the same-type brake operation sensors, one of the pressure sensors being configured to detect a pressure of a fluid of one of two brake systems output from a master cylinder, the other pressure sensor being configured to detect a pressure of a fluid of the other brake system output from the master cylinder; and a pedal stroke sensor (101) as the different-type brake operation sensor, the pedal stroke sensor being configured to detect an operation stroke of a brake pedal.

According to the present invention, it is possible to detect the brake operation amount appropriately. In addition, it is possible to check the brake operation sensors appropriately.

The present invention has further another feature that the brake control device comprises target value parallel-calculation means configured to parallel-calculate the target value acquired when the brake operation sensors are determined to be under the normal state and the target value acquired when the brake operation sensors are determined to be under the invalid state even in case that the brake operation sensors are determined to be under the normal state (S161).

According to the present invention, the target value parallel-calculation means parallel-calculates the target value acquired when the brake operation sensors are determined to be under the normal state and the target value acquired when it is assumed that the brake operation sensors are determined to be under the invalid state. Therefore, when the change of the states of the sensors occurs, it is possible to control the brake actuator toward the target value smoothly. Further, it is possible to independently adjust control constants each suitable for the states of the sensors and thus, the design can be facilitated.

Note that in the above description, for facilitating the understanding of the present invention, the elements corresponding to the elements of embodiments are accompanied with symbols used in the embodiments. However, the elements of the present invention are not limited to the elements of the embodiment denoted by the symbols.

BRIEF DESCRIPTION OF THE DRAWINGS

FIG. 1 is a schematic system configuration view for showing a brake control device for a vehicle according to an embodiment.

FIG. 2 is a view for showing a flowchart of a regenerative cooperative brake control routine.

FIG. 3 is a graph for showing a stroke deceleration degree map.

FIG. 4 is a graph for showing a master pressure deceleration degree map.

FIG. 5 is a graph for showing a weighting coefficient map.

FIG. 6 is a view for showing a flowchart of a sensor check routine.

FIG. 7 is a view for showing a flowchart of a sensor state setting routine for a first master pressure sensor.

FIG. 8 is a view for showing a flowchart of a sensor state setting routine for a second master pressure sensor.

FIG. 9 is a view for showing a flowchart of a sensor state setting routine for a stroke sensor.

FIG. 10 is a view for showing a flowchart of a held value setting routine for the first master pressure sensor.

FIG. 11 is a view for showing a flowchart of a held value setting routine for the second master pressure sensor.

FIG. 12 is a view for showing a flowchart of a held value setting routine for the stroke sensor.

FIG. 13 is a view for showing a flowchart of a simultaneous non-normal state flag setting routine.

FIG. 14 is a view for showing a flowchart of a manual mode setting routine.

FIG. 15 is a view for showing a flowchart of a target deceleration degree calculating routine.

FIG. 16 is a view for showing a flowchart of a master pressure selecting sub-routine.

FIG. 17 is a view for showing a flowchart of a variation suppressing control routine.

FIG. 18 is a view for showing a flowchart of a target value parallel-calculating routine.

FIG. 19 is a view for showing a flowchart of a held value setting routine for the first master pressure sensor according to a modified example.

FIG. 20 is a view for showing a flowchart of a held value setting routine for the second master pressure sensor according to the modified example.

FIG. 21 is a view for showing a flowchart of a held value setting routine for the stroke sensor according to the modified example.

FIG. 22 is a view for showing a flowchart of the target deceleration degree calculating routine according to the modified example.

FIG. 23 is a view for showing a flowchart of the master pressure selecting sub-routine according to the modified example.

DESCRIPTION OF THE PREFERRED EMBODIMENTS

Below, a brake control device for a vehicle according to an embodiment of the present invention will be described with reference to the drawings. FIG. 1 is a schematic system configuration view of the brake control device for the vehicle according to the present embodiment.

The brake control device according to the present embodiment has a brake pedal 10, a master cylinder 20, a brake actuator 40, a reservoir 60, a stroke simulator device 70, disc brake units 80FL, 80FR, 80RL and 80RR each provided on a respective vehicle wheel and a brake ECU 100 which is an electronic control unit for controlling a braking.

The disc brake unit 80FL has a brake disc 81FL and a wheel cylinder 82FL housed in a respective brake caliper. The disc brake unit 80FR has a brake disc 81FR and a wheel cylinder 82FR housed in a respective brake caliper. The disc brake unit 80RL has a brake disc 81RL and a wheel cylinder 82RL housed in a respective brake caliper. The disc brake unit 80RR has a brake disc 81RR and a wheel cylinder 82RR housed in a respective brake caliper. The wheel cylinder 82FL is connected to the brake actuator 40 and presses a respective brake pad to the brake disc 81FL rotating with the respective vehicle wheel by an operating fluid (a brake fluid) supplied from the brake actuator 40 to apply a braking force to the respective vehicle wheel. The wheel cylinder 82FR is connected to the brake actuator 40 and presses a respective brake pad to the brake disc 81FR rotating with the respective vehicle wheel by an operating fluid (a brake fluid) supplied from the brake actuator 40 to apply a braking force to the respective vehicle wheel. The wheel cylinder 82RL is connected to the brake actuator 40 and presses a respective brake pad to the brake disc 81RL rotating with the respective vehicle wheel by an operating fluid (a brake fluid) supplied from the brake actuator 40 to apply a braking force to the respective vehicle wheel. The wheel cylinder 82RR is connected to the brake actuator 40 and presses a respective brake pad to the brake disc 81RR rotating with the respective vehicle wheel by an operating fluid (a brake fluid) supplied from the brake actuator 40 to apply a braking force to the respective vehicle wheel.

The master cylinder 20 houses first and second pistons 23 and 24 slidably in a cylindrical casing 25 thereof having a bottom wall. The first piston 23 is positioned at the bottom wall side of the casing 25 and the second piston 24 is positioned at an opening side of the casing 25. A first fluid chamber 21 is defined between the first piston 23 and the bottom wall of the casing 25 and a second fluid chamber 22 is defined between the first and second pistons 23 and 24. A push rod 11 is connected to the second piston 24. The push rod 11 is connected to the brake pedal 10. A first spring 26 is provided between the first piston 23 and the bottom wall of the casing 25. The first spring 26 serves to bias the first piston 23 in a direction of separating the first piston 23 from the bottom wall of the casing 25, that is, in a direction of enlarging the first fluid chamber 21. A second spring 27 is provided between the first and second pistons 23 and 24. The second spring 27 serves to bias the first and second pistons 23 and 24 in a direction of separating the first and second pistons 23 and 24 from each other, that is, in a direction of enlarging the second fluid chamber 22.

The first fluid chamber 21 is connected to the wheel cylinder 82FL via a master passage 28 and the second fluid chamber 22 is connected to the wheel cylinder 82FR via a master passage 29. In the master cylinder 20, a depression of the brake pedal 10 advances the second piston 24. A force generated by the advancement of the second piston 24 is transmitted to the first piston 23 via the second spring 27 to advance the first piston 23. Thereby, the operating fluid in the first and second fluid chambers 21 and 22 is pressurized and then, the pressurized fluid pressures are transmitted to the wheel cylinders 82FL and 82FR, respectively. The fluid pressures in the first and second fluid chambers 21 and 22 are basically equal to each other. The first and second fluid chambers 21 and 22 are connected to the reservoir 60. The master cylinder 20 is configured to allow the operating fluid to flow from the reservoir 60 to the first fluid chamber 21 when the first piston 23 is retracted. Further, the master cylinder 20 is configured to prevent the operating fluid from flowing back when the first piston 23 is advanced. The master cylinder 20 is configured to allow the operating fluid to flow from the reservoir 60 to the second fluid chamber 22 when the second piston 24 is retracted. Further, the master cylinder 20 is configured to prevent the operating fluid from flowing back when the second piston 24 is advanced.

The stroke simulator device 70 is connected to the master passage 28. The stroke simulator device 70 is configured of a stroke simulator 71 and a simulator cut valve 72. The simulator cut valve 72 is a normally-closed electromagnetic valve which is maintained at a closed state by a biasing force of a spring when a solenoid is not energized and is open only when the solenoid is energized. The stroke simulator 71 has pistons, springs and the like. When the simulator cut valve 72 is open, the stroke simulator 71 introduces the operating fluid therein having an amount depending on the brake operation amount to allow the brake pedal 10 to be stroke-operated and generates a reaction force depending on the pedal operation amount to improve a feeling of the brake pedal operation of a driver.

The brake actuator 40 has a power fluid pressure generation device 30. The power fluid pressure device 30 has a pump 31 for pumping the operating fluid from the reservoir 60 via an inflow passage 61, a motor 32 for driving the pump 31, an accumulator 33 and a relief valve 34. The accumulator 33 converts a pressure energy of the operating fluid pressurized by the pump 31 to a pressure energy of a filling gas such as nitrogen and reserves the pressure energy of the filling gas therein. When the pressure of the operating fluid is excessively increased, the relief valve 34 is opened to return the operating fluid to the reservoir 60.

The brake actuator 40 has an accumulator passage 41 to which the pressurized operating fluid is supplied from the power fluid pressure generation device 30, a return passage 42 connected to the inflow passage 61 and four separated passages 43FL, 43FR, 43RL and 43RR. The separated passage 43FL is connected to the wheel cylinder 82FL. The separated passage 43FR is connected to the wheel cylinder 82FR. The separated passage 43RL is connected to the wheel cylinder 82RL. The separated passage 43RR is connected to the wheel cylinder 82RR. The brake actuator 40 has booster linear control valves 44FL, 44FR, 44RL and 44RR and connects the separated passage 43FL, 43FR, 43RL and 43RR to the accumulator passage 41 via the booster linear control valves 44FL, 44FR, 44RL and 44RR, respectively. Further, the brake actuator 40 has decompression linear control valves 45FL, 45FR, 45RL and 45RR and connects the separated passages 43FL, 43FR, 43RL and 43RR to the return passage 42 via the decompression linear control valves 45FL, 45FR, 45RL and 45RR, respectively.

Note that in this description, a symbol for indicating a member in association with a braking of a left front vehicle wheel is accompanied with "FL", a symbol for indicating a member in association with a braking of a right front vehicle wheel is accompanied with "FR", a symbol for indicating a member in association with a braking of a left rear vehicle wheel is accompanied with "RL" and a symbol for indicating a member in association with a braking of a right rear vehicle wheel is accompanied with "RR". Further, when it is not necessary to specify a position of the vehicle wheel in the description, "FL", "FR", "RL" and "RR" may be omitted.

The booster linear control valves 44 are electromagnetic linear control valves, respectively. An opening degree of each of the booster linear control valves 44 can be adjusted by controlling an energizing amount (an electric current value) applied to a respective solenoid thereof to continuously change the fluid pressure downstream of the booster linear control valve 44. The decompression linear control valves 45 are electromagnetic linear control valve, respectively. An opening degree of each of the decompression linear control valves 45 can be adjusted by controlling an energizing amount (an electric current value) applied to a solenoid thereof to continuously change the fluid pressure downstream of the decompression linear control valve 45. In the present embodiment, normally-closed electromagnetic linear control valves are used as the booster linear control valves 44FL, 44FR, 44RL and 44RR and the decompression linear control valves 45FL and 45FR for the front vehicle wheels and normally-open electromagnetic linear control valves are used as the decompression linear control valves 45RL and 45RR for the rear vehicle wheels. Therefore, when the solenoids of the booster linear control valves 44FL, 44FR, 44RL and 44RR are not energized, the booster linear control valves 44FL, 44FR, 44RL and 44RR are closed. On the other hand, when the solenoids of the booster linear control valves 44FL, 44FR, 44RL and 44RR are energized, the booster linear control valves 44FL, 44FR, 44RL and 44RR are opened by the opening degrees depending on the energizing amounts, respectively to allow the operating fluid to flow from the power fluid pressure generation device 30 into the wheel cylinders 82FL, 82FR, 82RL and 82RR to thereby increase the wheel cylinder pressures, respectively. Further, when the solenoids of the decompression linear control valves 45FL and 45FR for the front vehicle wheels are not energized, the decompression linear control valves 45FL and 45FR for the front vehicle wheels are closed. On the other hand, when the solenoids of the decompression linear control valves 45FL and 45FR for the front vehicle wheels, the decompression linear control valves 45FL and 45FR are opened by the opening degrees depending on the energizing amounts, respectively to allow the operating fluid to flow from the wheel cylinders 82FL and 82FR into the reservoir 60 to thereby decrease the wheel cylinder pressures, respectively. Furthermore, when the solenoids of the decompression linear control valves 45RL and 45RR for the rear vehicle wheels are not energized, the decompression linear control valves 45RL and 45RR for the rear vehicle wheels are opened to allow the operating fluid to flow from the wheel cylinders 82RL and 82RR into the reservoir 60 to thereby decrease the wheel cylinder pressures, respectively. On the other hand, when the solenoids of the decompression linear control valves 45RL and 45RR for the rear vehicle wheels are energized, the decompression linear control valves 45RL and 45RR for the rear vehicle wheels are closed to prevent the operating fluid from flowing from the wheel cylinders 82RL and 82RR into the reservoir 60, respectively. In this case, when the energizing amounts of the solenoids of the decompression linear control valves 45RL and 45RR are small, valve bodies of the decompression linear control valves 45RL and 45RR do not move until closed positions, respectively and the opening degrees of the decompression linear control valves 45RL and 45RR are adjusted to opening degrees depending on the energizing amounts, respectively.

Therefore, a control of the energizing of the booster and decompression linear control valves 44 and 45 can change a state of the operating fluid among the state of allowing the operating fluid to flow from the power fluid pressure generation device 30 into the wheel cylinder 82, the state of allowing the operating fluid from the wheel cylinder 82 into the reservoir 60 and the state of preventing the operating fluid from flowing from the power fluid pressure generation device 30 into the wheel cylinder 82 and preventing the operating fluid from flowing from the wheel cylinder 82 into the reservoir 60. Thereby, the wheel cylinder pressures for the vehicle wheels can be controlled to respective target fluid pressures, independently.

The brake actuator 40 has master cut valves 46 and 47. The brake actuator 40 connects the master passage 28 to the separated passage 43FL via the master cut valve 46 and connects the master passage 29 to the separated passage 43FR via the master cut valve 47. The two master cut valves 46 and 47 are normally-open electromagnetic valves, respectively. Therefore, each of the master cut valves 46 and 47 is maintained at an open state by a biasing force of a spring thereof when a solenoid thereof is not energized. On the other hand, each of the master cut valves 46 and 47 is opened only when the solenoid thereof is energized. When the master cut valve 46 is closed, the flow of the operating fluid between the first fluid chamber 21 of the master cylinder 20 and the wheel cylinder 82FL is shut off. On the other hand, when the master cut valve 46 is opened, the bidirectional flow of the operating fluid between the first fluid chamber 21 of the master cylinder 20 and the wheel cylinder 82FL is allowed. Similarly, when the master cut valve 47 is closed, the flow of the operating fluid between the second fluid chamber 22 of the master cylinder 20 and the wheel cylinder 82FR is shut off. On the other hand, when the master cut valve 47 is opened, the bidirectional flow of the operating fluid between the second fluid chamber 22 of the master cylinder 20 and the wheel cylinder 82FR is allowed.

The brake actuator 40 has an accumulator pressure sensor 51, master cylinder pressure sensors 52L and 52R and wheel cylinder pressure sensors 53FL, 53FR, 53RL and 53RR. The accumulator pressure sensor 51 is provided to the accumulator passage 41 and detects an accumulator pressure Pacc corresponding to a fluid pressure output from the power fluid pressure generation device 30. The master cylinder pressure sensor 52L is provided to the master passage 28 between the first fluid chamber 21 of the master cylinder 20 and the master cut valve 46 and detects a fluid pressure of the operating fluid pressurized in the first fluid chamber 21. The master cylinder pressure sensor 52R is provided to the master passage 29 between the second fluid chamber 22 of the master cylinder 20 and the master cut valve 47 and detects a fluid pressure of the operating fluid pressurized in the second fluid chamber 22. The master cylinder pressure sensors 52L and 52R correspond to "same-type brake operation sensors", respectively according to the present invention each for detecting an operation amount corresponding to an amount of a depression of the brake pedal 10 exerted by the driver. Hereinafter, the master cylinder pressure sensor 52L will be referred to as the first master pressure sensor 52L and the master cylinder pressure sensor 52R will be referred to as the second master pressure sensor 52R. Further, the fluid pressure detected by the first master pressure sensor 52L will be referred to as the first master pressure Pm1 and the fluid pressure detected by the second master pressure sensor 52R will be referred to as the second master pressure Pm2. Furthermore, when it is not necessary to distinguish the first master pressure sensor 52L from the second master pressure sensor 52R, the first and second master pressure sensors 52L and 52R will be referred simply to as the master pressure sensors 52, respectively.

The wheel cylinder pressure sensors 53FL, 53FR, 53RL and 53RR are provided to the separated passages 43FL, 43FR, 43RL and 43RR, respectively and detect the fluid pressures of the wheel cylinders 82FL, 82FR, 82RL and 82RR, respectively. The fluid pressures detected by the wheel cylinder pressure sensors 53FL, 53FR, 53RL and 53RR will be referred to as the wheel cylinders PwFL, PwFR, PwRL and PwRR, respectively.

The brake actuator 40 and the stroke simulator device 70 are drive-controlled by the brake ECU 100. The brake ECU 100 has a microcomputer as a main part and has a pump drive circuit, an electromagnetic valve drive circuit, an input interface to which various of sensor signals are input, a communication interface and the like. The brake ECU 100 is connected to the four booster linear control valves 44, the four decompression linear control valves 45, the master cut valves 46 and 47 and the simulator cut valve 72 and outputs solenoid drive signals to the valves, respectively to control the open-and-closed state and the opening degrees (in case of the linear control valves) of the valves, respectively. Further, the brake ECU 100 is connected to the motor 32 provided in the power fluid pressure generation device 30 and outputs a drive signal to the motor 32 to drive-control the motor 32.

Furthermore, the brake ECU 100 is connected to the accumulator pressure sensor 51, the first master pressure sensor 52L, the second master pressure sensor 52R and the wheel cylinder pressure sensors 53FR, 53FL, 53RR and 53RL and receives signals for indicating the accumulator pressure Pacc, the first master pressure Pm1, the second master pressure Pm2 and the wheel cylinder pressures PwFR, PwFL, PwRR and PwRL, respectively.

Further, the brake ECU 100 is connected to a pedal stroke sensor 101. The pedal stroke sensor 101 detects a pedal stroke corresponding to a depression operation amount of the brake pedal 10 and outputs a signal indicating the detected pedal stroke Sp to the brake ECU 100. The pedal stroke sensor 101 corresponds to a different-type brake operation sensor according to the present invention. Hereinafter, the pedal stroke sensor 101 will be referred simply to as the stroke sensor 101.

Next, a brake control executed by the brake ECU 100 will be described. According to the present embodiment, at least two braking modes including a linear control mode and a manual mode are set and the brake ECU 100 changes the braking mode from one of the braking modes to the other braking mode and vice versa in accordance with an abnormal state in the brake control device. The linear control mode is normally selected. When the abnormal state is detected, the manual mode is selected as necessity.

The vehicle provided with the brake control device according to the present embodiment is a hybrid vehicle provided with at least one motor driven by a battery source and an engine driven by a gasoline fuel. The hybrid vehicle has a regenerative braking device (not shown) for generating a regenerative braking force by making the motor generate an electric power by a rotation force of the vehicle wheels and recovering the generated electric power to a battery. The brake ECU 100 is connected to a hybrid ECU 200 for controlling the regenerative braking device in intercommunication manner with the hybrid ECU 200. When the brake ECU 100 executes a regenerative braking with the regenerative braking device, the brake ECU 100 calculates a target total braking force with respect to the vehicle wheels on the basis of the brake operation amount and sets, as a target friction braking force, a braking force obtained by subtracting a regenerative braking force generated by the regenerative braking device from the target total braking force. The brake ECU 100 controls an operation of the brake actuator 40 such that the fluid pressure of the wheel cylinder 82 follows a target fluid pressure set in accordance with the target friction braking force. The brake control executed in cooperative manner with the regenerative braking device will be referred to as the regenerative cooperative brake control.

The regenerative cooperative brake control is executed under the linear control mode. Under the linear control mode, a depressing force of the brake pedal 10 exerted by the driver is used only for detecting the brake operation amount and is not transmitted to the wheel cylinders 82 while the fluid pressure output from the power fluid pressure generation device 30 adjusted by the booster linear control vales 44 and the decompression linear control valves 45, respectively, is transmitted to the wheel cylinders 82. On the other hand, under the manual mode, the fluid pressure pressurized by the brake pedal depression force is transmitted to the wheel cylinders 82. The brake ECU 100 changes a route of the flow of the operating fluid by the brake actuator 40 to change the braking mode from the linear control mode to the manual mode or vice versa. Note that under the linear control mode, it is not always necessary to execute the regenerative cooperative brake control.

Under the manual mode, stopped is an energizing of all of the electromagnetic on-off valves and the electromagnetic linear control valves provided in the brake actuator 40. Therefore, maintained at the opened state are the master cut valves 46 and 47 and the decompression linear control valves 45RL and 45RR for the rear wheels which are normally-open electromagnetic valves, respectively. On the other hand, maintained at the closed state are the simulator cut valve 72, the four booster linear control valves 44 and the decompression linear control valve 45FL and 45FR for the front wheels which are normally-closed electromagnetic valves, respectively. In addition, an energizing of the power fluid pressure generation device 30 is also stopped.

Thus, under the manual mode, the communication between the power fluid pressure generation device 30 and each of the wheel cylinders 82 is shut off. On the other hand, independently formed are a fluid pressure passage of a brake system for a left front vehicle wheel for communicating the first fluid chamber 21 with the wheel cylinder 82FL and a fluid pressure passage of a brake system for a right front vehicle wheel for communicating the second fluid chamber 22 with the wheel cylinder 82FR. Therefore, the master cylinder pressure generated by the pedal depression force exerted by the driver is transmitted to the wheel cylinder 82FL for the left front vehicle wheel and the wheel cylinder 82FR for the right front vehicle wheel, independently.

<Regenerative Cooperative Brake Control>

Next, described will be the regenerative cooperative brake control executed when the braking mode is set to the linear control mode. FIG. 2 shows a regenerative cooperative brake control routine executed by the brake ECU 100. The regenerative cooperative brake control routine is executed repeatedly in a predetermined short cycle.

At a step S11, the brake ECU 100 reads the pedal stroke Sp detected by the stroke sensor 101, the first master pressure Pm1 detected by the first master pressure sensor 52L and the second master pressure Pm2 detected by the second master pressure sensor 52R. Next, at a step S12, the brake ECU 100 determines whether or not the brake pedal is operated by the driver on the basis of those detection values. For example, the brake ECU 100 determines that the brake pedal is operated when detected is at least one of the pedal stroke Sp larger than an operation determination threshold Spref and the first or second master pressure Pm1 or Pm2 larger than an operation determination threshold Pmref.

When the brake ECU 100 determines that the brake pedal is not operated at the step S12, the brake ECU 100 proceeds with the process to a step S13 to stop energizing the brake actuator 40 and then, terminates the present routine once. Therefore, maintained at the opened state are the master cut valve 46 and 47 and the decompression linear control valves 45RL and 45RR for the rear vehicle wheels which are normally-closed electromagnetic valves provided in the brake actuator 40. Further, maintained at the closed state are the simulator cut valve 72, the four booster linear control valves 44 and the decompression linear control valves 45FL and 45FR for the front vehicle wheels which are normally-closed electromagnetic valves. The brake ECU 100 repeats the processes described above until the operation of the brake pedal is detected. Note that the brake ECU 100 controls the operation of the motor 32 such that the accumulator pressure Pacc is within a set pressure range independently of the operation of the brake pedal.

When the operation of the brake pedal is detected at the step S12, the brake ECU 100 changes the states of the master cut valves 46 and 47 to the closed state, respectively and the state of the simulator cut valve 72 to the open state. Next, at a step S15, the brake ECU 100 calculates a target deceleration degree $G^*$ of a vehicle body on the basis of the brake operation amount. In this case, the brake ECU 100 calculates the target deceleration degree $G^*$ of the vehicle body on the basis of the pedal stroke Sp detected by the stroke sensor 101, the first master pressure Pm1 detected by the first master pressure sensor 52L and the second master pressure Pm2 detected by the second master pressure sensor 52R. The set target deceleration degree $G^*$ increases as the pedal stroke Sp increases and as the master pressure Pm increases. For example, the brake ECU 100 stores a stroke deceleration degree map of a target deceleration degree $GS^*$ associated with the pedal stroke Sp shown in FIG. 3, a master pressure deceleration degree map of a target deceleration degree $Gp^*$ associated with the master pressure Pm shown in FIG. 4 and a weight coefficient map of a weight coefficient $\alpha$ ($0 \leq \alpha \leq 1$) associated with the master pressure Pm shown in FIG. 5 and calculates the target deceleration degree $G^*$ in accordance with a following expression (1).

$$G^* = (1-\alpha) \cdot Gp^* + \alpha \cdot GS^* \quad (1)$$

In this case, the brake ECU 100 calculates an average master pressure Pmave (=(Pm1+Pm2)/2) which is an average value of the first and second master pressures Pm1 and Pm2 and then, the target deceleration degree $Gp^*$ corresponding to the average master pressure Pmave by using the average master pressure Pmave as the master pressure Pm of the master pressure deceleration degree map. Further, the brake ECU 100 sets the weight coefficient $\alpha$ corresponding to the master pressure Pm with reference to the weight coefficient map. The weight coefficient is set such that the weight coefficient decreases as the master pressure Pm increases. Therefore, when the weight coefficient $\alpha$ is applied to the expression (1), a weight applied to the target deceleration degree $Gp^*$ increases as the master pressure Pm increases. In other words, in case of calculating the target deceleration degree $G^*$, the weight applied to the pedal stroke Sp is larger than the weight applied to the master pressure Pm at the beginning of the depression of the brake pedal 10 and thereafter, as the amount of the depression of the brake pedal increases, the weight applied to the master pressure Pm becomes larger than the weight applied to the pedal stroke Sp.

Next, the brake ECU 100 calculates a target total braking force $F^*$ of the vehicle wheels set corresponding to the target deceleration degree $G^*$ at a step S16, calculates a target regenerative braking force $Fa^*$ at a following step S17 and sends a regenerative braking request and the target regenerative braking force $Fa^*$ to the hybrid ECU 200 provided in the regenerative braking device at a step S18. The brake ECU 100 calculates a maximum regenerative braking force corresponding to a vehicle speed on the basis of a vehicle speed information and sets a smaller one of the target total braking force $F^*$ and the maximum regenerative braking force as the target regenerative braking force $Fa^*$. Therefore, when the target total braking force $F^*$ is smaller than the maximum regenerative braking force, the target total braking force $F^*$ is set as the target regenerative braking force $Fa^*$ and on the other hand, when the target total braking force $F^*$ is larger than the maximum regenerative braking force, the maximum regenerative braking force is set as the target regenerative braking force $Fa^*$. Note that the maximum regenerative braking force may be calculated in consideration of the vehicle speed information as well as, for example, information on a charging state of the battery provided periodically from the hybrid ECU 200.

The hybrid ECU 200 determines whether or not the regenerative braking request has been sent from the brake ECU 100 constantly repeatedly with a predetermined period and when the hybrid ECU 200 receives the regenerative braking request, operates a motor (not shown) as an electric generator so as to generate a regenerative braking force proximate to the target regenerative braking force $Fa^*$ up to the target regenerative braking force $Fa^*$. Electric power generated by the motor is recovered to the battery. The hybrid ECU 200 calculates a regenerative braking force actually generated by the motor (this braking force will be referred to as the actual regenerative braking force Fa) and sends information on the actual regenerative braking force Fa to the brake ECU 100.

The brake ECU 100 reads the actual regenerative braking force Fa at a step S19 and calculates a target friction braking force $Fb^*$ by subtracting the actual regenerative braking force Fa from the target total braking force $F^*$ at a following step S20 ($Fb^* = F^* - Fa$). Next, at a step S21, a first ECU 120 distributes the target friction braking force $Fb^*$ to each of the four vehicle wheels at a predetermined distribution ratio to thereby calculate:

a left front target fluid pressure $PFL^*$ set corresponding to the distributed left front target braking force $FbFL^*$, a right front target fluid pressure $PFR^*$ set corresponding to the distributed right front target braking force $FbFR^*$, a left rear target fluid pressure $PRL^*$ set corresponding to the distributed left rear target braking force $FbRL^*$, and a right rear target fluid pressure $PRR^*$ set corresponding to the distributed right rear target braking force $FbRR^*$.

Next, at a step S22, the brake ECU 100 controls an electric current for each of the solenoids of the booster linear control valves 44FL, 44FR, 44RL and 44RR and the decompression linear control valves 45FL, 45FR, 45RL and 45RR by feedback-controlling the fluid pressures such that the wheel cylinder pressure PwFL detected by the wheel cylinder pressure sensor 53FL corresponds to the target fluid pressure $PFL^*$, the wheel cylinder pressure PwFR detected by the wheel cylinder pressure sensor 53FR corresponds to the target fluid pressure $PFR^*$, the wheel cylinder pressure PwRL detected by the wheel cylinder pressure sensor 53RL corresponds to the target fluid pressure $PRL^*$, and the wheel cylinder pressure PwRR detected by the wheel cylinder pressure sensor 53RR corresponds to the target fluid pressure $PRR^*$.

After the brake ECU 100 executes the process of the step S22, the brake ECU 100 terminates the present routine once. Then, the brake ECU 100 repeats this routine with a predetermined period. In this manner, every the operation of the brake pedal by the driver, the drive of the brake actuator 40 is controlled on the basis of the brake operation amount to generate friction braking forces in the vehicle wheels, respectively.

<Sensor Check Routine>

Next, described will be a fail-safe with respect to malfunctions of the sensors for detecting the brake operation amounts, respectively. First, described will be a check of the sensors for detecting the brake operation amounts, respectively. FIG. 6 shows a flowchart of a sensor check routine executed by the brake ECU 100. This sensor check routine is executed repeatedly with a predetermined short calculation period. At a step S31, the brake ECU 100 reads a first master pressure Pm1 detected by the first master pressure sensor 52L and executes an individual check of the first master pressure sensor 52L. For example, this individual check is a process for determining whether or not a detection signal (an electric voltage value) of the first master pressure Pm1 is within an appropriate range. When the first master pressure sensor 52L is malfunctioned or a disconnecting, a short circuit or the like occurs in a signal output line, an electric power source line or a ground line, the signal electric voltage output by the first master pressure sensor 52L deviates from a normal range. Therefore, when the detection signal corresponding to the first master pressure Pm1 is not within an appropriate range, the brake ECU 100 determines that the first master pressure sensor 52L is not under a normal state. Next, at a step S32, similar to the step S31, the brake ECU 100 reads the second master pressure Pm2 detected by the second master pressure sensor 52R and executes an individual check of the second master pressure sensor 52R.

Next, at a step S33, the brake ECU 100 reads a pedal stroke Sp detected by the stroke sensor 101 and executes an individual check of the stroke sensor 101. The stroke sensor 101 has two sensor elements therein and detection signals are output from the sensor elements, respectively to the brake ECU 100. Each of the sensor elements is, for example, a Hall effect IC and outputs a detection signal corresponding to the common pedal stroke. Therefore, the sensor elements output the same detection signals, respectively when the stroke sensor 101 is under the normal state. Thus, when a degree of a difference between the detection signals is large, the brake ECU 100 determines that the stroke sensor 101 is not under the normal state. When a disconnecting or a short circuit or the like occurs in a signal output line or an electric power source line or a ground line of the stroke sensor 101, the signal electric voltage output from the stroke sensor 101 deviates from a normal range. Therefore, when the detection signal of the stroke sensor 101 is not within an appropriate range, the brake ECU 100 determines that the stroke sensor 101 is not under the normal state.

Next, the brake ECU 100 executes a comparing check of the detection values of the two master pressure sensors 52L and 52R. First, at a step S34, the brake ECU 100 calculates a master pressure difference $\Delta Pm$ (=|Pm1−Pm2|) which is an absolute value of a difference between the first and second master pressures Pm1 and Pm2 detected by the first and second master pressure sensors 52L and 52R, respectively. Then, at a step S35, the brake ECU 100 determines whether or not the master pressure difference $\Delta Pm$ exceeds a determination threshold $\Delta Pmref$ and when the master pressure difference $\Delta Pm$ does not exceed the determination threshold $\Delta Pmref$, terminates the present routine once.

On the other hand, when the master pressure difference $\Delta Pm$ exceeds the determination threshold $\Delta Pmref$, at least one of the master pressure sensors 52 can be deemed to be not under the normal state and thus, the brake ECU 100 executes a comparing check of comparing the master pressure sensors 52 and the stroke sensor 101 with each other. In this case, at a step S36, the brake ECU 100 determines whether or not the stroke sensor 101 has been determined to be not under the normal state in the individual check executed at the step S33. When the stroke sensor 101 has been determined to be not under the normal state, the brake ECU 100 terminates the present routine once. On the other hand, when the stroke sensor 101 has been determined to be under the normal state, the brake ECU 100 executes, at a step S37, a comparing check of comparing the first master pressure Pm1 detected by the first master pressure sensor 52L and the pedal stroke Sp detected by the stroke sensor 101 with each other. In this case, the brake ECU 100 converts the pedal stroke Sp to a value equivalent to the master cylinder pressure and calculates a stroke/master pressure difference $\Delta Pms$ (=|Pm1−Ps|) which is an absolute value of a difference between the converted value Ps and the first master pressure Pm1. When the stroke/master pressure difference $\Delta Pms$ exceeds a determination threshold $\Delta Pmsref$, the brake ECU 100 determines that the first master pressure sensor 52L is not under the normal state. Similarly, the brake ECU 100 executes a comparing check of comparing the second master pressure Pm2 detected by the second master pressure sensor 52R and the pedal stroke Sp detected by the stroke sensor 101 with each other. In this case, the brake ECU 100 calculates a stroke/master pressure difference $\Delta Pms$ (=|Pm2−Ps|) which is an absolute value of a difference between the converted value Ps and the second master pressure Pm2 and when the stroke/master pressure difference $\Delta Pms$ exceeds the determination threshold $\Delta Pmsref$, determines that the second master pressure sensor 52R is not under the normal state.

The brake ECU 100 executes the sensor check routine described above repeatedly with a predetermined calculation period. In this case, the brake ECU 100 stores and updates check results every the execution of the sensor check routine.

Note that added to the sensor check routine described above may be a process for comparing one of the master pressures (Pm1 or Pm2) or an average value of the master pressures ((Pm1+Pm2)/2) and the pedal stroke Sp with each other when the master pressure difference $\Delta Pm$ (=|Pm1−Pm2|) is equal to or smaller than the determination threshold $\Delta Pmref$ and determining that the stroke sensor 101 is not under the normal state when an absolute value (for example, |Pm1−Sp|) between the master pressure or the average value of the master pressures and the pedal stroke is larger than the determination threshold.

The detection values of the master pressure sensors 52L and 52R and the stroke sensor 101 may deviate temporally from a normal range. Accordingly, in the present embodiment, when a sensor is determined to be not under the normal state on the basis of the check results of the sensors, the determined sensor is regarded as an invalid-state sensor and when the sensor has been determined to be under the invalid state for a predetermined time or more, the sensor is fixed as an abnormal-state sensor. The brake ECU 100 regards the state of each of the sensors as any of the normal, invalid and abnormal states and calculates the target deceleration degree G* by using the detection values depending on the states of the sensors, respectively in accordance with the expression (1).

<Sensor State Setting Routine>

FIGS. 7 to 9 show sensor state setting routines executed by the brake ECU 100, respectively. FIG. 7 shows a sensor state setting routine of the first master pressure sensor 52L, FIG. 8 shows a sensor state setting routine of the second master pressure sensor 52R and FIG. 9 shows a sensor state setting routine of the stroke sensor 101. Each of the sensor state setting routines is executed repeatedly with a predetermined short period and concurrently with the sensor check routine described above.

Here, the sensor state setting routine of the first master pressure sensor 52L shown in FIG. 7 is described and detailed descriptions of the sensor state setting routines of the second master pressure sensor 52R and the stroke sensor 101 will be omitted since the sensor state setting routines of the second master pressure sensor 52R and the stroke sensor 101 are similar to the sensor state setting routine of the first master pressure sensor 52L, respectively.

The brake ECU 100 reads a check result of the sensor check routine with respect to the first master pressure sensor 52L at a step S41 and determines, at a following step S42, whether or not the first master pressure sensor 52L has been determined to be not under the normal state. When the first master pressure sensor 52L has been determined to be not under the normal state, the brake ECU 100 clears a timer value TP1 to zero at a step S43. The timer value TP1 is used for measuring a duration time which the first master pressure sensor 52L has been determined to be not under the normal state. The brake ECU 100 sets a value of a sensor state flag F1 to "0" at a following step S44. The sensor state flag F1 indicates the present state of the first master pressure sensor 52L. The sensor state flag F1 indicates the normal state when the value thereof is "0". The sensor state flag F1 indicates the invalid state when the value thereof is "1". The sensor state flag F1 indicates the abnormal state when the value thereof is "2". Therefore, at the step S44, the first master pressure sensor 52L is set as a normal-state sensor. Next, at a step S45, the brake ECU 100 stores a detection value (the first master pressure Pm1) detected by the first master pressure sensor 52L in a memory. In this case, a single detection value may be stored and latter detection values may be stored. As described later, the stored detection value is used as a provisional detection value (held value) when the first master pressure sensor 52L has been set as the invalid-state sensor.

On the other hand, when the first master pressure sensor 52L has been determined to be not under the normal state (S42: No), the brake ECU 100 increments the timer value TP1 by 1 at a step S46. Next, at a step S47, the brake ECU 100 determines whether or not the timer value TP1 is equal to or larger than a predetermined abnormal-state fixing time A. When the timer value TP1 is smaller than the abnormal-state fixing time A, the brake ECU 100 sets the value of the sensor state flag F1 to "1" at a step S48. Therefore, at the step S48, the first master pressure sensor 52L is set as the invalid-state sensor.

In case that the state of the first master pressure sensor 52L becomes the non-normal state temporally, the first master pressure sensor 52L is determined to be under the normal state in the sensor check routine after the first master pressure sensor 52L is determined to be not under the normal state. Thus, the value of the sensor state flag F1 is returned to "0" (S42 and S43). On the other hand, when the state that the first master pressure sensor 52L is determined to be not under the normal state has continued and the timer value TP1 becomes equal to or larger than the abnormal-state fixing time A (S47: Yes), the brake ECU 100 sets the value of the sensor state flag F1 to "2" at a step S49. Therefore, at the step S49, the first master pressure sensor 52L is set as the abnormal-state sensor. Next, the brake ECU 100 turns a warning lamp (not shown) to inform the drive of the occurrence of the abnormal state at a step S50. In addition, the brake ECU 100 stores an error code of a non-volatile memory. After the brake ECU 100 sets the value of the sensor state flag F1 to "2", the brake ECU 100 maintains the value of the sensor state flag F1 at "2" unless a predetermined reset process is executed.

The brake ECU 100 repeatedly executes the sensor state setting routine described above with a predetermined short calculation period.

The brake ECU 100 also executes sensor state setting routines with respect to the second master pressure sensor 52R and the stroke sensor 101 similar to the sensor state setting routine with respect to the first master pressure sensor 52L. In this case, processes of steps S51 to S60 of the sensor state setting routine (FIG. 8) with respect to the second master pressure sensor 52R correspond to the processes of the steps S41 to S50 of FIG. 7, respectively. The state of the second master pressure sensor 52R is indicated by a sensor state flag F2. The sensor state flag F2 indicates the normal state when the value thereof is "0". The sensor state flag F2 indicates the invalid state when the value thereof is "1". The sensor state flag F2 indicates the abnormal state when the value thereof is "2". Further, a duration time that the second master pressure sensor 52R has been determined to be not under the normal state is measured by a timer value TP2.

Similarly, processes of steps S61 to S70 of the sensor state setting routine (FIG. 9) with respect to the stroke sensor 101 correspond to the processes of the steps S41 to S50 of FIG. 7, respectively. The state of the stroke sensor 101 is indicated by a sensor state flag FS. The sensor state flag FS indicates the normal state when the value thereof is "0". The sensor state flag FS indicates the invalid state when the value thereof is "1". The sensor state flag FS indicates the abnormal state when the value thereof is "2". Further, a duration time that the stroke sensor 101 has been determined to be not under the normal state is measured by a timer value Ts. When the timer value Ts becomes equal to or larger than an abnormal-state fixing time B, the stroke sensor 101 is fixed as the abnormal-state sensor. The abnormal-state fixing time B may be the same as or different from the abnormal-state fixing time A.

<Held Value Setting Routine>

Next, the held value will be described. As described above, the brake ECU 100 calculates the target deceleration degree G* in accordance with the expression (1) by using the detection values Pm1, Pm2 and Sp detected by the two master pressure sensors 52L and 52R and the single stroke sensor 101, respectively. In this case, as described later, when any of the two master pressure sensors 52L and 52R has been set as the invalid-state sensor, the detection value of the master pressure sensor determined to be under the normal state is used for the calculation. On the other hand, when both of the two master pressure sensors have been set as the invalid-state sensor, respectively, the held value is used for the calculation.

Further, when the stroke sensor 101 has been set as the invalid-state sensor, the held value is used for the calculation. The held value is a detection value detected immediately before the sensor, which has been determined to be under the normal state, is set as the invalid-state sensor and corresponds to a last value according to the present invention.

FIGS. 10 to 12 show held value setting routines executed by the brake ECU 100, respectively. FIG. 10 shows a held value setting routine with respect to the first master pressure sensor 52L. FIG. 11 shows a held value setting routine with respect to the second master pressure sensor 52R. FIG. 12 shows a held value setting routine with respect to the stroke sensor 101. Each of the held value setting routines is executed repeatedly with a predetermined short period concurrently with the sensor check routine and the sensor state setting routines described above.

When the brake ECU 100 starts the held value setting routine, first, at a step S71, the brake ECU 100 determines whether or not the value of the sensor state flag F1 is "1". When the value of the sensor state flag F1 is not "1", the brake ECU 100 terminates the present routine once. On the other hand, when the value of the sensor state flag F1 is "1", at a step S72, the brake ECU 100 determines whether or not the last value of the sensor state flag F1(n−1) (the value of the sensor state flag F1 set before one calculation cycle) was "0". In other words, the brake ECU 100 determines whether or not the value of the sensor state flag F1 changes from "0" to "1" at this calculation timing. When the determination of the step S72 is "Yes", the brake ECU 100 sets the last detected value of the first master pressure Pm1(n−1) as the held value Pm1' of the first master pressure sensor at a step S73 (Pm1'←Pm1(n−1)). The symbol "(n−1)" means the value before one calculation cycle. Thereby, set as the held value is the detection value detected immediately before the first master pressure sensor 52L is set as the invalid-state sensor. The held value is stored and held. On the other hand, when the determination of the step S72 is "No", the setting of the held value Pm1' is already completed and thus, the brake ECU 100 terminates the present routine once. Note that the held value Pm1' is not limited to the single lastly-detected value and may be a value equivalent to the lastly-detected value such as an average value of the predetermined number of the detection values detected for a time period immediately before the lastly-detected value is detected. The same applies to the held values Pm2' and Sp'.

The brake ECU 100 executes the held value setting routines with respect to the second master pressure sensor 52R and the stroke sensor 101, respectively similar to the held value setting routine with respect to the first master pressure sensor 52L. In this case, processes of steps S81 to S83 of the held value setting routine (FIG. 11) with respect to the second master pressure sensor 52R correspond to the processes of the steps S71 to S73 of FIG. 10. The held value Pm2' is a detection value detected immediately before the second master pressure sensor 52R is set as the invalid-state sensor. Further, processes of steps S91 to S93 of the held value setting routine (FIG. 12) with respect to the stroke sensor 101 correspond to the processes of the steps S71 to S73 of FIG. 10. The held value Sp' is a detection value detected immediately before the stroke sensor 101 is set as the invalid-state sensor.

<Simultaneous Non-Normal-State Flag Setting Routine>

When the abnormal-state fixing time is set to a long time, the abnormal state can be prevented from being fixed due to a temporary variation of the sensor value. As described later, in the present embodiment, after both of the two master pressure sensors 52L and 52R are determined to be not under the normal state, the target deceleration degree G* is calculated by using the held value Pm1' or Pm2' until the abnormal state is fixed. In this case, when long is a time period of calculating the target deceleration degree G* by using the held values Pm1' or Pm2', a following property decreases and thus, the braking force remains even when the driver releases the brake pedal, that is, a so-called braking force remaining phenomena may occur.

Accordingly, in the present embodiment, when both of the two master pressure sensors 52L and 52R are determined to be not under the normal state, the two master pressure sensors 52L and 52R, which have been set as the invalid-state sensor, is readily set as the abnormal-state sensor as described below.

FIG. 13 shows a simultaneous non-normal-state flag setting routine executed by the brake ECU 100. The simultaneous non-normal-state flag setting routine is executed repeatedly with a predetermined short period concurrently with the sensor check routine, the sensor state setting routines and the held value setting routines described above. At a step 101, the brake ECU 100 determines whether or not the value of the sensor state flag F1 is not "0". When the value of the sensor state flag F1 is "0" (S101: No), the brake ECU 100 clears a simultaneous timer value TP12 to zero at a step S102 and then, terminates the present routine once. The simultaneous timer value TP12 serves to measure a time that either of the first and second master pressure sensors 52L and 52R have not been set as the normal-state sensor. When the value of the sensor state flag F1 is not "0" (S101: Yes), the brake ECU 100 determines whether or not the value of the sensor state flag F2 is not "0" at a step S103. When the value of the sensor state flag F2 is "0" (S103: No), the brake ECU 100 proceeds with the process to the step S102 to clear the simultaneous timer value TP12 to zero.

When either of the values of the two sensor state flags F1 and F2 are not "0" (S103: Yes), the brake ECU 100 increments the simultaneous timer value TP12 by 1 at a step S104. Next, at a step S105, the brake ECU 100 determines whether or not the simultaneous timer value TP12 is equal to or larger than an abnormal-state fixing time C. The abnormal-state fixing time C is set to a value smaller than the abnormal-state fixing time A used for determining each of the master pressure sensors 52L and 52R, which have been set as the invalid-state sensor, to be under the abnormal state. When the simultaneous time value TP12 is smaller than the abnormal-state fixing time C, the brake ECU 100 terminates the present routine once. When the processes described above are repeated and the simultaneous timer value TP12 becomes equal to or larger than the abnormal-state fixing time C (S105: Yes), the brake ECU 100 sets the values of the two sensor state flags F1 and F2 to "2", respectively, that is, fixes the two master pressure sensors 52L and 52R as the abnormal-state sensor at a step S106. When both of the values of the sensor state flags F1 and F2 are set to "2", respectively, the regenerative cooperative brake control is stopped and the braking mode is changed to the manual mode as described later.

For example, when one of the two master pressure sensors 52L and 52R has been set as the invalid or abnormal-state sensor and then, the other master pressure sensor, which has been determined as the normal-state sensor, is set as the invalid-state sensor, the simultaneous timer starts to measure the time (TP12←TP12+1). Then, if any of the master pressure sensors 52, which has been determined as the invalid-state sensor, is determined to be under the normal state before the abnormal-state fixing time C has been elapsed after the simultaneous timer starts to measure the time, the simultaneous timer value TP12 is cleared to zero. On the other hand, if both of the master pressure sensors 52 are not determined to be under the normal state, the values of the two sensor state flags F1 and F2 are set to "2", respectively.

<Manual Mode Setting Routine>

The brake ECU 100 calculates the target deceleration degree G* on the basis of the master pressures Pm1 and Pm2, which are detected by the two master pressure sensors 52L and 52R, respectively and indicate the brake pedal operation amount, respectively, and the pedal stroke Sp, which is detected by the stroke sensor 101 and indicates the brake pedal operation amount. In addition, the brake ECU 100 changes the braking mode from the linear control mode to the manual mode in response to the states of the three sensors 52L, 52R and 101. FIG. 14 shows a manual mode setting routine executed by the brake ECU 100. The manual mode setting routine is executed repeatedly with a predetermined short period concurrently with the sensor state setting routine.

At a step S111, the brake ECU 100 reads the values of the sensor state flags F1, F2 and FS each set by the respective sensor state setting routine and determines whether or not two or more of the values of the sensor state flags F1, F2 and FS have been set to "2" for indicating the abnormal state. When two or more of the values of the sensor state flags F1, F2 and FS have not been set to "2" (S111: No), the brake ECU 100 terminates the present routine once. Therefore, the linear control mode (the regenerative cooperative brake control) is continued. The brake ECU 100 repeats this routine with a predetermined short period. On the other hand, when two or more of the values of the sensor state flags F1, F2 and FS have been set to "2" (S111: Yes), the brake ECU 100 changes the braking mode from the linear control mode to the manual mode at a step S112 and then, terminates the present routine. Thereby, the energizing of all the electromagnetic on-off valves and the electromagnetic linear control valves provided in the brake actuator 40 is stopped. Therefore, the master cylinder pressure generated by the depression of the brake pedal exerted by the driver is transmitted to the wheel cylinders 82FL and 82FR for the left and right front vehicle wheels, respectively.

The brake control device according to the present embodiment has totally three sensors such as the two master pressure sensor 52L and 52R and the stroke sensor 101 as sensors each for detecting the brake pedal operation amount. When two of the sensors are under the abnormal state, the comparing check cannot be executed and thus, the accuracy of the check of the remaining sensor or sensors may be decreased. Accordingly, in the manual mode setting routine, when two or more of the values of the sensor state flags F1, F2 and FS are set to "2", the braking mode is changed to the manual mode. In other words, when all of the states of the sensors except one of the sensors are set as the abnormal-state sensors, the braking mode is changed to the manual mode. Therefore, when only one of the sensors is determined to be under the normal state, the braking mode is changed to the manual mode.

<Selection of Brake Operation Amount>

As described above, the target deceleration degree G* is calculated on the basis of the first and second master pressures Pm1 and Pm2 and the pedal stroke Sp, which indicate the brake operation amounts, at the step S15 of the regenerative cooperative brake control routine. In this case, the target deceleration degrees Gp* and GS* are set with reference to the master pressure deceleration degree map shown in FIG. 4 and the stroke deceleration degree map shown in FIG. 3 and the target deceleration degree G* is calculated in accordance with the aforementioned expression (1). Here, described will be a calculation method including a calculation method in case that at least one of the sensors 52L, 52R and 101 is determined to be not under the normal state.

FIG. 15 shows a target deceleration degree calculation routine executed as the process of the step S15, depending on the states of the sensors. First, at a step S120, the brake ECU 100 executes a process of selecting the master pressure Pm. This process will be described with reference to FIG. 16. FIG. 16 shows a master pressure selecting sub-routine executed as the process of the step S120. At a step S121, the brake ECU 100 determines whether or not both of the values of the sensor state flags F1 and F2 are "0". When the brake ECU 100 determines "Yes", that is, the two master pressure sensors 52L and 52R have been determined to be under the normal state, the brake ECU 100 sets the master pressure Pm used for referring to the master pressure deceleration degree map to an average value of the first and second master pressures Pm1 and Pm2 at a step S122 (Pm←(Pm1+Pm2)/2).

On the other hand, when the brake ECU 100 determines "No" at the step S121, the brake ECU 100 determines whether or not the value of the sensor state flag F1 is "0" at a step S123. When the determination result is "Yes", that is, only the first master pressure sensor 52L has been determined to be under the normal state, the brake ECU 100 sets the first master pressure Pm1 as the master pressure Pm at a step S124 (Pm←Pm1). On the other hand, when the brake ECU 100 determines "No" at the step S123, the brake ECU 100 determines at a step S125 whether or not the value of the sensor state flag F2 is "0". When the determination result is "Yes", that is, only the second master pressure sensor 52R has been determined to be under the normal state, the brake ECU 100 sets the second master pressure Pm2 as the master pressure Pm at a step S126 (Pm←Pm2).

When it is determined "No" at the step S125, either of the two master pressure sensors 52L and 52R have been determined to be not under the normal state. In this case, at a step S127, the brake ECU 100 determines whether or not both of the values of the sensor state flags F1 and F2 are "1". When the determination result is "Yes", that is, both of the two master pressure sensors 52L and 52R have been set as the invalid-state sensor, the brake ECU 100 determines at a step S128 whether or not the timer value TP2 is larger than the timer value TP1. When the timer value TP2 is larger than the timer value TP1, the brake ECU 100 sets the held value Pm1' of the first master pressure sensor as the master pressure Pm at a step S129 (Pm←Pm1'). On the other hand, when the timer value TP2 is equal to or smaller than the timer value TP1, the brake ECU 100 sets the held value Pm2' of the second master pressure sensor as the master pressure Pm at a step S130 (Pm←Pm2'). In other words, set as the master pressure Pm is the held value of the master pressure sensor which has been determined as the invalid-state sensor for a shorter time.

When it is determined "No" at the step S127, any of the two master pressure sensors 52L and 52R has been determined to be under the abnormal state. In this case, the brake ECU 100 determines at a step S131 determines whether or not the value of the sensor state flag F1 is "2". When it is determined "Yes", that is, only the first master pressure sensor 52L has been determined to be under the abnormal state, the brake ECU 100 proceeds with the process to the step S130 to set the held value Pm2' of the second master pressure sensor as the master pressure Pm. On the other hand, when it is determined "No", that is, the second master pressure sensor 52R has been determined to be under the abnormal state, the brake ECU 100 proceeds with the process to the step S129 to set the held value Pm1' of the first master pressure sensor as the master pressure Pm. Note that when both of the master pressure sensors 52L and 52R have been determined to be under the abnormal state, the braking mode has been set to the manual mode as described above (S112 of FIG. 14) and thus, this routine is not executed.

After the brake ECU 100 sets the master pressure Pm by the execution of the master pressure selecting sub-routine, the brake ECU 100 proceeds with the process to a step S141 of FIG. 15. At the step S141, the brake ECU 100 calculates the target deceleration degree Gp* corresponding to the master pressure Pm with reference to the master pressure deceleration degree map shown in FIG. 4.

Next, at a step S142, the brake ECU 100 determines whether or not the value of the sensor state flag FS with respect to the stroke sensor 101 is "2". When the determination result is "Yes", that is, the stroke sensor has been determined to be under the abnormal state, the brake ECU 100 sets the weight coefficient α to zero at a step S143 (α=0). In other words, the detection value of the stroke sensor 101 cannot be used and thus, the weight for this detection value is set to zero.

On the other hand, when the value of the sensor state flag FS with respect to the stroke sensor 101 is not "2" (S142: No), the brake ECU 100 determines at a step S144 whether or not the value of the sensor state flag FS is "0". When the determination result is "Yes", that is, the stroke sensor 101 has been determined to be under the normal state, the brake ECU 100 sets the pedal stroke Sp detected by the stroke sensor 101 as the pedal stroke Sp used for referring to the stroke deceleration degree map at a step S145. On the other hand, when the determination of the step S144 is "No", that is, the stroke sensor 101 has been set as the invalid-state sensor, the brake ECU 100 sets the held value Sp' of the stroke sensor 101 as the pedal stroke Sp used for referring to the stroke deceleration degree map at a step S146.

After the brake ECU 100 sets the pedal stroke Sp used for referring to the stroke deceleration degree map in this manner, the brake ECU 100 calculates the target deceleration degree GS* corresponding to the pedal stroke Sp with reference to the stroke deceleration degree map at a step S147. In other words, when the stroke sensor 101 has been determined to be under the normal state, the brake ECU 100 calculates the target deceleration degree GS* by applying the detection value Sp of the stroke sensor 101 to the stroke deceleration degree map. On the other hand, when the stroke sensor 101 has been set as the invalid-state sensor, the brake ECU 100 calculates the target deceleration degree GS* by applying the held value Sp' to the stroke deceleration degree map.

After the brake ECU 100 executes the process of the step S143 or S147, the brake ECU 100 calculates the target deceleration degree G* in accordance with the aforementioned expression (1). In this case, when the stroke sensor 101 has been determined to be under the abnormal state, the target deceleration degree G* is set by using only the master pressure sensors 52L and 52R.

<Function/Effect of Embodiment>

According to the brake control device of the present embodiment described above, the following function and effect can be obtained.

1. The brake control device has two master pressure sensors 52L and 52R which are the same in type. When one of the master pressure sensors 52 has been set as the invalid-state sensor and the other master pressure sensor 52 has been set as the normal-state sensor, the brake control device calculates a target value (the target deceleration degree Gp*) by using the detection value of the master pressure sensor 52 set as the normal-state sensor without using the detection value of the master pressure sensor 52 set as the invalid-state sensor (S123 to S126). Thus, a period (the abnormal-state fixing time A) that the state of the sensor has been set as the invalid state can be increased and during the period, the sensor abnormal-state determination can be executed with a high accuracy.

2. When either of the two master pressure sensors 52L and 52R have been determined to be not under the normal state, the brake control device calculates the target value by using the held value of the master pressure sensor or sensors set as the invalid-state sensor (S127 to S131). In this case, a time that either of the two sensors have been determined to be not under the normal state, that is, the abnormal-state fixing time C which is a limit time for calculating the target value by using the held value, is set to a time shorter than the abnormal-state fixing time A used for changing the state of the sensor from the invalid state to the abnormal state. Thus, when either of the two master pressure sensors 52L and 52R are determined to be not under the normal state, the determined states of the sensors are readily changed from the invalid state to the abnormal state. As a result, the generation of the brake remaining phenomena can be suppressed.

3. The brake control device changes the braking mode from the linear control mode to the manual mode when two of the three sensors (the master pressure sensors 52L and 52R and the stroke sensor 101) each for detecting the brake operation amount are determined as the abnormal-state sensor (S111 and S112). Thereby, a safe property can be further improved.

4. When the brake control device compares the detection values of the two master pressure sensors 52L and 52R with each other and as a result, the master pressure difference ΔPm corresponding to the difference between those detection values exceeds the determination value ΔPmref, the brake control device checks the master pressure sensors 52 by comparing the detection values of the master pressure sensors 52L and 52R and the stroke sensor 101 with each other (S34 to S37). Thus, the check can be executed with a high accuracy.

Here, described will be a case that the fail-safe function of the brake control device according to the present embodiment can be particularly effectively used. The sliding friction resistance of the piston of the master cylinder 20 may be increased in order to improve the feeling of the brake pedal operation. In this case, when the sliding friction resistance of the first piston 23 is increased, a delay occurs in generation of the fluid pressure in the first fluid chamber 21. Accordingly, in the present exmple, even when a difference between the fluid pressures in the first and second fluid chambers 21 and 22 is generated, the detection values of the master pressure sensors 52R and 52L and the stroke sensor 101 are compared with each other and thus, both of the two master pressure sensors 52 are unlikely to be set as the invalid-state sensor. In addition, when one of the two master pressure sensors 52 has been determined to be under the normal state, the detection value of the master pressure sensor 52 set as the invalid-state sensor is not used for the calculation of the target value and thus, the period that the sensor state has been set as the invalid state (the abnormal-state fixing time A) can be increased. Therefore, the aforementioned advantageous effect can be obtained.

<Modified Example>

A modified example of the present embodiment will be described.

<Variation Suppressing Process>

As described above, in case that the calculation method of the target value (the target deceleration degree G*) is selected depending on the state of the sensor, the target value may be considerably varied when the determined state of the sensor changes. Accordingly, it is preferred that a variation suppressing process described below is executed. FIG. 17 shows a variation suppressing control routine executed by the brake ECU 100. It is preferred that this variation suppressing control routine is, for example, executed between the steps S15 and S16 of the regenerative cooperative brake control shown in FIG. 2.

When the brake ECU 100 starts the variation suppressing control routine, the brake ECU 100 determines at a step S151 whether or not a parameter or parameters used for calculating the target deceleration degree G* is or are changed due to the change of the determined sensor state or states during a latest predetermined period. In other words, the brake ECU 100 determines whether or not at least one of the parameters (Pm1, Pm1', Pm2 and Pm2') used for setting the master pressure Pm used for referring to the master pressure deceleration degree map has been changed and whether or not at least one of the parameters (Sp and Sp') used for setting the pedal stroke Sp used for referring to the stroke deceleration degree map has been changed. When no parameter has been changed during the latest predetermined period, the brake ECU 100 terminates the present routine once. On the other hand, when at lease one of the parameters has been changed during the latest predetermined period, the brake ECU 100 calculates a target value variation amount $\Delta G^*$ $(=|G^*(n)-G^*(n-1)|)$ which is an absolute value of a difference between the target deceleration degree $G^*(n)$ calculated at this time and the target deceleration degree $G^*(n-1)$ calculated before one calculation cycle at a step S152. Next, at a step S153, the brake ECU 100 determines whether or not the target value variation amount $\Delta G^*$ exceeds an upper limit value $\Delta Gmax$. When the target value variation amount $\Delta G^*$ exceeds the upper limit value $\Delta Gmax$, the brake ECU 100 limits the variation amount of the target deceleration degree $G^*$ by using the upper limit value $\Delta Gmax$ at a step S154. In other words, the brake ECU 100 corrects the target deceleration degree $G^*$ to a value obtained by adding the upper limit value $\Delta Gmax$ to the lastly-calculated target deceleration degree $G^*(n-1)$ (or when the target deceleration degree $G^*$ is decreasing, a value obtained by subtracting the upper limit value $\Delta Gmax$ from the lastly-calculated target deceleration degree $G^*(n-1)$) ($G^*=G^*(n-1)+/-\Delta Gmax$). Then, the brake ECU 100 proceeds with the process to the step S16. On the other hand, when the target value variation amount $\Delta G^*$ does not exceed the upper limit value $\Delta Gmax$, no large variation occurs in the target value and thus, the brake ECU 100 skips the process of the step S154. Note that in case that the variation amount of the target deceleration degree $G^*$ is limited even at a normal time that no parameter is changed, it is preferred that the limitation of the variation amount of this modified example is more strict than the limitation of the variation amount at the normal time (the upper limit value $\Delta Gmax$ of this modified example is smaller than the upper limit value $\Delta Gmax$ at the normal time).

According to this variation suppressing process, even when the determined state of the sensor is changed, the variation of the target deceleration degree $G^*$ derived from the change of the determined state of the sensor is suppressed. Note that the variation suppressing process may be configured to limit the variation amount of the target deceleration degree $G^*$ as well as the variation amount of the other target value (the target braking force, the target fluid pressure, the target electric current of the linear control valve or the like).

<Target Value Parallel-Calculation Process>

In the present embodiment, the target value (the target deceleration degree $G^*$) is calculated on the basis of the single determined sensor state. However, sensor states including the determined sensor state as well as an assumed sensor state or states may be determined and the target values corresponding to the sensor states, respectively may be parallel-calculated. FIG. 18 shows a target value parallel-calculation routine executed by the brake ECU 100. The target value parallel-calculation routine is executed repeatedly with a predetermined short calculation period.

When the brake ECU 100 starts the target value parallel-calculation routine, the ECU 100 calculates the target deceleration degrees $G^*$ corresponding to the sensor states, respectively at a step S161. For example, with respect to the two master pressure sensors 52L and 52R, as shown in FIG. 16, the brake ECU 100 calculates the target deceleration degrees $Gp^*$ by using the master pressures Pm set depending on the states of the master pressure sensors 52L and 52R (S122, S124, S126, S129 and S130), respectively. With respect to the stroke sensor 101, the brake ECU 100 calculates the target deceleration degrees $Gs^*$ by using the two pedal strokes Sp set as shown by the steps S145 and S146 of FIG. 15, respectively. Then, with respect to all of combinations of the calculated target deceleration degrees $Gp^*$ and $Gs^*$, the brake ECU 100 calculates the target deceleration degrees $G^*$. The brake ECU 100 stores control constants such as deceleration degree maps suitable for the sensor states, respectively and calculates the target deceleration degrees $G^*$ corresponding to the sensor states on the basis of the control constants, respectively. Note that it is not necessary to calculate the target deceleration degrees $G^*$ with respect to all of the combinations and thus, the target deceleration degrees $G^*$ may be calculated with respect to predetermined limited number of the combinations.

Next, at a step S162, the brake ECU 100 reads the present sensor states set by the sensor state setting routines. Next, at a step S163, the brake ECU 100 selects the target deceleration degree $G^*$ corresponding to the present sensor state from the previously calculated target deceleration degrees $G^*$ and then, terminates the present routine once.

According to this target value parallel-calculation process, the target values depending on the sensor states are parallel-calculated and thus, a brake control system can be easily designed. In other words, the control constants suitable for the sensor states can be adjusted corresponding to the respective sensor states and thus, the design cannot be complicated. Further, when the determined sensor state is changed, the brake actuator 40 can be controlled smoothly toward the target value.

<Holding of Target Value>

In the embodiment described above, when the determined sensor state is changed from the normal state to the invalid state, the lastly-detected sensor value is stored as the held value. However, in place of this, the lastly-calculated target value may be stored as the held value. In this case, for example, the held value setting routines shown in FIGS. 10 to 12 are replaced with held value setting routines shown in FIGS. 19 to 21, the target deceleration degree calculating routine shown in FIG. 15 is replaced with a target deceleration degree calculating routine shown in FIG. 22 and the master pressure selecting sub-routine show in FIG. 16 is replaced with a master pressure selecting sub-routine shown in FIG. 23.

In the held value setting routine shown in FIG. 19, the process of the step S73 is replaced with a process of a step S73'. At the step S73', the brake ECU 100 sets the target deceleration degree $Gp^*(n-1)$ acquired immediately before the first master sensor 52L is set as the invalid-state sensor as the held value $Gp'$ ($Gp' \leftarrow Gp^*(n-1)$). Further, in the held value setting routine shown in FIG. 20, the process of the step S83 is replaced with a process of a step S83'. At the step S83', the brake ECU 100 sets the target deceleration degree $Gp^*(n-1)$ acquired immediately before the second master sensor 52R is set as the invalid-state sensor as the held value $Gp'$ ($Gp' \leftarrow Gp^*(n-1)$). Furthermore, in the held value setting routine shown in FIG. 21, the process of the step S93 is replaced with a process of a step S93'. At the step S93', the brake ECU 100 sets the target deceleration degree $Gs^*(n-1)$ acquired immediately before the stroke sensor 101 is set as the invalid-state sensor as the held value Gs' (Gs'←Gs*(n−1)).

Further, in the target deceleration degree calculation routine shown in FIG. 22, the process of the step S146 is replaced with a process of a step S146'. At the step S146', the brake ECU 100 sets the held value Gs' as the target deceleration degree Gs* (Gs*←Gs') and proceeds with the process to the step S148. Furthermore, in the master pressure selecting sub-routine shown in FIG. 23, the processes of the steps S127 to S131 are omitted and these processes are replaced with a process of a step S129'. In this case, when the brake ECU 100 determines "No" at the step S125, that is, either of the two master pressure sensors 52L and 52R have been determined to be not under the normal state, the brake ECU 100 proceeds with the process to the step S129'. At the step S129', the brake ECU 100 sets the held value Gp' as the target deceleration degree Gp* (Gp*←Gp'). In this case, when there are the held values Gp' set at the steps S73' and S83', the latter one of the held values Gp' is set as the target deceleration degree Gp*. When the brake ECU 100 sets the target deceleration degree Gp* at the step S129', the brake ECU 100 skips the next step S141 to proceed with the process to the step S142.

A function and an effect similar to the function and the effect obtained in the embodiment can be obtained by using the target values in place of the detection values as the held values.

The brake control device for the vehicle according to each of the present embodiment and the modified example has been described. However, the present invention is not limited to the embodiment and the modified example and various modification can be employed without departing from the object of the present invention.

For example, the present embodiment relates to the brake control device applied to the hybrid vehicle. However, the vehicle is not limited to the hybrid vehicle and for example, a vehicle provided with only an internal combustion engine as a travelling drive source may be employed or an electric vehicle may be employed.

Further, in the present embodiment, the target deceleration degree G* is calculated on the basis of the brake operation amount. However, the target value calculated on the basis of the brake operation amount is not limited to the target of the deceleration degree. For example, the target braking force may be calculated on the basis of the brake operation amount, the target wheel cylinder pressure may be calculated on the basis of the brake operation amount or the target electric current of the linear control valve may be calculated on the basis of the brake operation amount. Therefore, such a target value acquired immediately before the sensor is set as the invalid-state sensor may be set as the held value.

Further, the present embodiment has two pressure sensors each for detecting the fluid pressure as the same-type sensors each for detecting the brake operation amount. However, the present invention is not limited to the pressure sensor. The present invention can be applied to a configuration having depression force sensors each for detecting the depression force of the brake pedal or a configuration having the stroke sensors. Furthermore, the number of the same-type sensors may be three or more.

The invention claimed is:

1. A brake control device for a vehicle, the brake control device comprising:
    a brake actuator for applying braking forces to wheels of the vehicle;
    a brake operation member operated by a driver of the vehicle; and
    at least two same-type brake operation sensors which are the same in type, each of the same-type brake operation sensors being configured to detect, as a detection value, a value which changes in response to an operation amount of the brake operation member,
    the brake control device comprising an electronic control unit for calculating a target value used for a control of the brake actuator and controlling the brake actuator in accordance with the target value,
    wherein the electronic control unit is programmed:
    to determine whether or not each of the same-type brake operation sensors is a normal-state sensor;
    to set, as an invalid-state sensor, the same-type brake operation sensor not determined as the normal-state sensor;
    to hold, as a last value in association with the invalid-state sensor, one of the detection value detected by the invalid-state sensor immediately before the same-type brake operation sensor is set as the invalid-state sensor and the target value calculated immediately before the same-type brake operation sensor is set as the invalid-state sensor;
    to fix, as an abnormal-state sensor, the invalid-state sensor when the same-type brake operation sensor has continued to be set as the invalid-state sensor for a predetermined sensor abnormal-state fixing time or more;
    to calculate the target value by using the latest detection value detected by the normal-state sensor when one of the same-type brake operation sensors is set as the invalid-state sensor and the other same-type brake operation sensor is determined as the normal-state sensor;
    to calculate the target value by using the last value held in association with the invalid-state sensor when either of the same-type brake operation sensors are determined to be not the normal-state sensor and at least one of the same-type brake operation sensors is set as the invalid-state sensor; and
    to execute an abnormal-state-associated process when either of the same-type brake operation sensors have continued to be determined to be not the normal-state sensor for an abnormal-state process determination time or more.

2. The brake control device as set forth in claim 1, wherein the abnormal-state process determination time is shorter than the sensor abnormal-state fixing time.

3. The brake control device as set forth in claim 1, wherein the vehicle further comprises at least one different-type brake operation sensor, a type of which is different from the type of the same-type brake operation sensors,
    the electronic control unit is programmed:
    to determine that any of the same-type brake operation sensors is not the normal-state sensor when an absolute value of a difference between the detection values detected by the same-type brake operation sensors, respectively is larger than a determination threshold; and
    to specify the same-type brake operation sensor which is not the normal-state sensor by using a detection value detected by the different-type brake operation sensor.

4. The brake control device as set forth in claim 3, wherein the electronic control unit is programmed:
    to determine whether or not the different-type brake operation sensor is a normal-state sensor; and to execute a process for stopping the control of the brake actuator as the abnormal-state-associated process when only one of the same-type and different-type brake operation sensors has been determined as the normal-state sensor.

5. The brake control device as set forth in claim 3, wherein the vehicle further comprises:
   two brake systems;
   a master cylinder for outputting fluid pressures to the brake systems, respectively;
   two pressure sensors for detecting the fluid pressures in the brake systems, respectively;
   a brake pedal; and
   a pedal stroke sensor for detecting an operation stroke of the brake pedal,
   the same-type brake operation sensors are the pressure sensors, respectively,
   the brake operation member is the brake pedal, and
   the different-type brake operation sensor is the pedal stroke sensor.

6. The brake control device as set forth in claim 1, wherein the electronic control unit is programmed:
   to calculate the target value by using the latest detection values detected by the brake operation sensors, respectively and calculate the target value by using the last values to be held assuming that one of the brake operation sensors is set as the invalid-state sensor when all of the brake operation sensor have been determined to be the normal-state sensor;
   to select the target value corresponding to the states of the brake operation sensor from the calculated target values; and
   to control the brake actuator in accordance with the selected target value.

7. The brake control device as set forth in claim 1, wherein the electronic control unit is programmed to execute, as the abnormal-state-associated process, a process for setting all of the same-type brake operation sensors as an abnormal-state sensor when all of the same-type brake operation sensors have continued to be determined to be not the normal-state sensor for the abnormal-state process determination time or more.

* * * * *